United States Patent
Hsu

(10) Patent No.: US 8,072,540 B2
(45) Date of Patent: Dec. 6, 2011

(54) APPARATUS AND METHOD FOR LOW ANGLE INTERPOLATION

(75) Inventor: Jeng-Yun Hsu, Hsin Chu (TW)

(73) Assignee: Silicon Integrated Systems Corp., Hsin Chu (TW)

( * ) Notice: Subject to any disclaimer, the term of this patent is extended or adjusted under 35 U.S.C. 154(b) by 449 days.

(21) Appl. No.: 12/411,155

(22) Filed: Mar. 25, 2009

(65) Prior Publication Data

US 2010/0085476 A1 Apr. 8, 2010

(30) Foreign Application Priority Data

Oct. 8, 2008 (TW) ................ 97138645 A

(51) Int. Cl.
*H04N 7/01* (2006.01)
*H04N 11/20* (2006.01)
(52) U.S. Cl. ................ 348/448; 348/450
(58) Field of Classification Search .......... 348/441, 348/448, 450–453, 458, 459; 382/300; *H04N 7/01, H04N 11/20*
See application file for complete search history.

(56) References Cited

U.S. PATENT DOCUMENTS

| 7,535,512 | B2 * | 5/2009 | Chao ................ 348/448 |
| 7,973,858 | B2 * | 7/2011 | Pai et al. ............ 348/452 |
| 2005/0163401 | A1 | 7/2005 | Park | |
| 2008/0074538 | A1 | 3/2008 | Chang | |

FOREIGN PATENT DOCUMENTS

EP 0550231 A1 7/1993
EP 0687104 A2 12/1995

OTHER PUBLICATIONS

Salonen et al., "Edge Adaptive Interpolation for Scanning Rate Conversions," Signal Processing of HDTV, Proceedings of the International Workshop on HDTV, Jan. 1, 1993, pp. 757-764, vol. 4.
Yong Ding et al., "A Novel De-Interlace Based on Spacio-Temporal Weight Adaptive and Edge-Directed Interpolation," Signal Processing, The $8^{th}$ International Conference on, IEEE, Jan. 1, 2006, all pages.

* cited by examiner

*Primary Examiner* — Sherrie Hsia
(74) *Attorney, Agent, or Firm* — Muncy, Geissler, Olds & Lowe, PLLC

(57) ABSTRACT

An apparatus of low angle interpolation is disclosed, which includes a low angle calculation circuit, a direction decision circuit, a post-processing circuit, an interpolator and a line buffer. According to a counterclockwise operating matrix and a clockwise operating matrix whose shapes look like triangles, the invention calculates sum of absolute differences (SAD) for each specified angle to correctly detect edges, thereby minimizing jaggies and frequency alias.

20 Claims, 18 Drawing Sheets

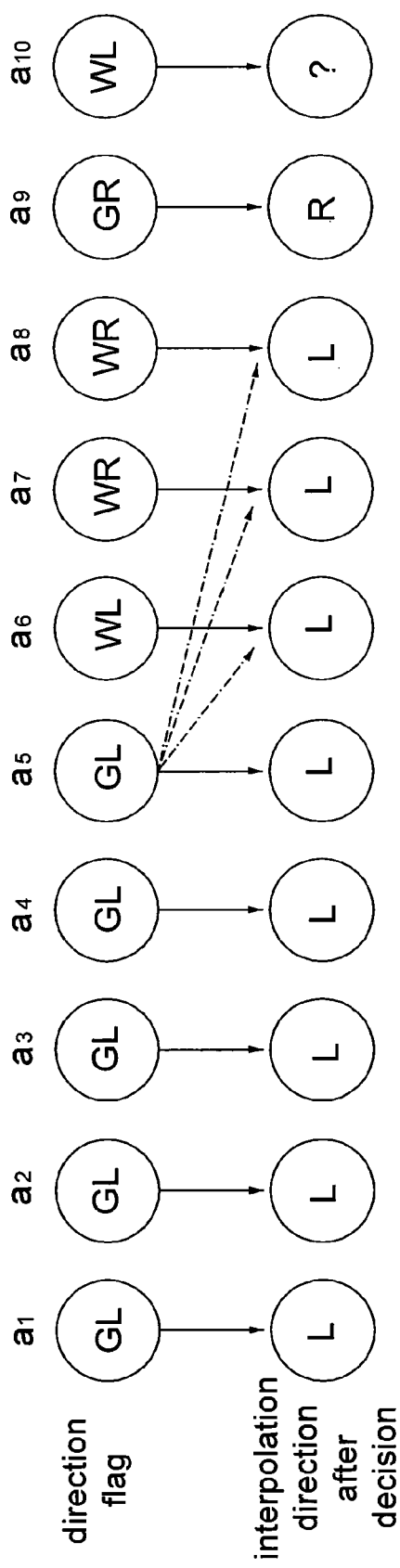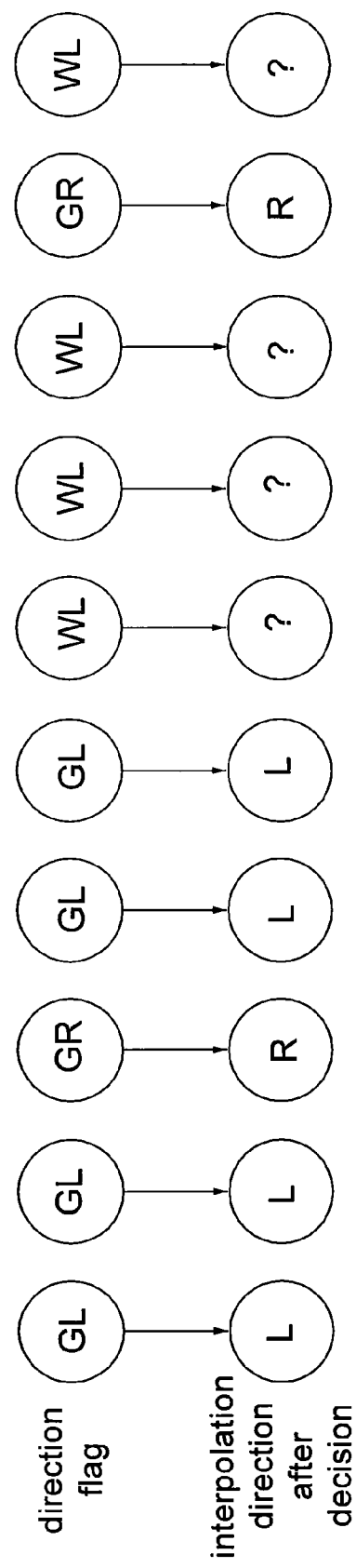
FIG. 7A
FIG. 7B

APPARATUS AND METHOD FOR LOW ANGLE INTERPOLATION

This application claims the benefit of the filing date of Taiwan Application Ser. No. 097138645, filed on Oct. 8, 2008, the content of which is incorporated herein by reference.

BACKGROUND OF THE INVENTION

1. Field of the Invention

The invention relates to imaging processing technology, particularly to an apparatus and method of low angle interpolation.

2. Description of the Related Art

The process of converting interlaced video signals into progressive video signals is called deinterlacing. There are various deinterlacing techniques, including intra-field deinterlacing, inter-field deinterlacing, motion adaptive deinterlacing, motion compensated deinterlacing and so forth. The low angle interpolation method, one of intra-field deinterlacing methods, is utilized to detect edges, find edge directions or edge angles and thereby perform interpolation along the edge directions.

Thus, a need exists for a new method and apparatus for correctly detecting edges and obtaining the correct edge directions in order to minimize the jaggies and frequency alias effectively.

SUMMARY OF THE INVENTION

In light of the above-mentioned problems, one objective of the invention is to provide an apparatus of low angle interpolation to calculate the sum of absolute differences (SAD) according to triangle-like counterclockwise operating and clockwise operating matrixes to thereby correctly detect edges and effectively reduce jaggies.

In order to achieve the above objective, the apparatus of low angle interpolation according to the invention is used to generate an interpolated scan line between a first scan line and a second line of a field. The apparatus comprises a low angle calculation circuit, a line buffer, a direction decision circuit, a post-processing circuit, and an interpolator. The low angle calculation circuit receives all luminance values of the first scan line and of the second scan line, calculates and compares sums of absolute differences (SADs) of all angles of each pixel in the interpolated scan line and generates a plurality of operating parameters of each pixel in the interpolated scan line based on a counterclockwise operating matrix and a clockwise operating matrix. The line buffer stores final interpolation directions of all pixels of the preceding interpolated scan line. The direction decision circuit coupled to the line buffer and the low angle calculation circuit determines a temporary interpolation angle of each pixel in the interpolated scan line based on the operating parameters of each pixel in the interpolated scan line and the final interpolation directions of all the pixels of the preceding interpolated scan line. The post-processing circuit, coupled to the line buffer and the direction decision circuit, performs calibration on the interpolation direction and determines a final interpolation angle and the final interpolation direction of each pixel in the interpolated scan line based on the temporary interpolation angles of all the pixels in the interpolated scan line and the final interpolation directions of all the pixels of the preceding interpolated scan line. The interpolator coupled to the post-processing circuit receives the final interpolation angle of each pixel of the interpolated scan line, both the luminance values and chrominance values of all pixels in the first scan line, and both the luminance values and the chrominance values of all pixels in the second scan line, and performs interpolation corresponding to either the final interpolation angle or 90 degrees depending on an absolute chrominance error of each pixel in the interpolated scan line so as to obtain the luminance value and the chrominance value of each pixel in the interpolated scan line; wherein, each of the final interpolation angle and the temporary final interpolation angle comprises the interpolation direction information.

Another objective of the invention is to provide a method of low angle interpolation for generating an interpolated scan line between the first scan line and the second line. The method comprises the following steps: calculating and comparing the sum of the absolute differences of all angles of each pixel in the interpolated scan line to generate a plurality of operating parameters for each pixel in the interpolated scan line based on all luminance values of the first scan line, all luminance values of the second scan line, a counterclockwise operating matrix, and a clockwise operating matrix; determining temporary interpolation angles of all the pixels in the interpolated scan line, based on the operating parameters of each pixel in the interpolated scan line and the final interpolation directions of all the pixels of the preceding interpolated scan line; performing calibration on interpolation directions based on the temporary interpolation angles of all the pixels in the interpolated scan line and the final interpolation direction of each pixel of the preceding interpolated scan line to determine the final interpolation angles and the final interpolation directions of all the pixels in the interpolated scan line; and, performing interpolation corresponding to either the final interpolation angle or 90 degrees depending on an absolute chrominance error of each pixel in the interpolated scan line so as to obtain the luminance value and the chrominance value of each pixel in the interpolated scan line based on the final interpolation angle of each pixel in the interpolated scan line, both the luminance values and the chrominance values of all the pixels in the first scan line, and both the luminance values and the chrominance values of all the pixels in the second scan line; wherein each of the final interpolation angle and the temporary final interpolation angle comprises the interpolation direction information.

Accompanying with the following figures, examples and claims, the above and other objectives and advantages of the invention will be described in detail in the following.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 7A shows a schematic diagram illustrating that the clockwise effectiveness of the three consecutive pixels having GL can be extended to the following three consecutive pixels having WL.

FIG. 7B shows a schematic diagram illustrating that three consecutive pixels having GL cannot be found and thus the interpolation directions for the pixels having WL or WR cannot be decided.

DETAILED DESCRIPTION OF THE INVENTION

The low angle interpolation apparatus according to the invention may be hardware, software, or a combination of hardware and software (or firmware). An example of a pure solution would be a field programmable gate array (FPGA) design or an application specific integrated circuit (ASIC) design. An example of a hardware and software implementation would be a digital signal processor (DSP) and embedded firmware.

Figure 1:
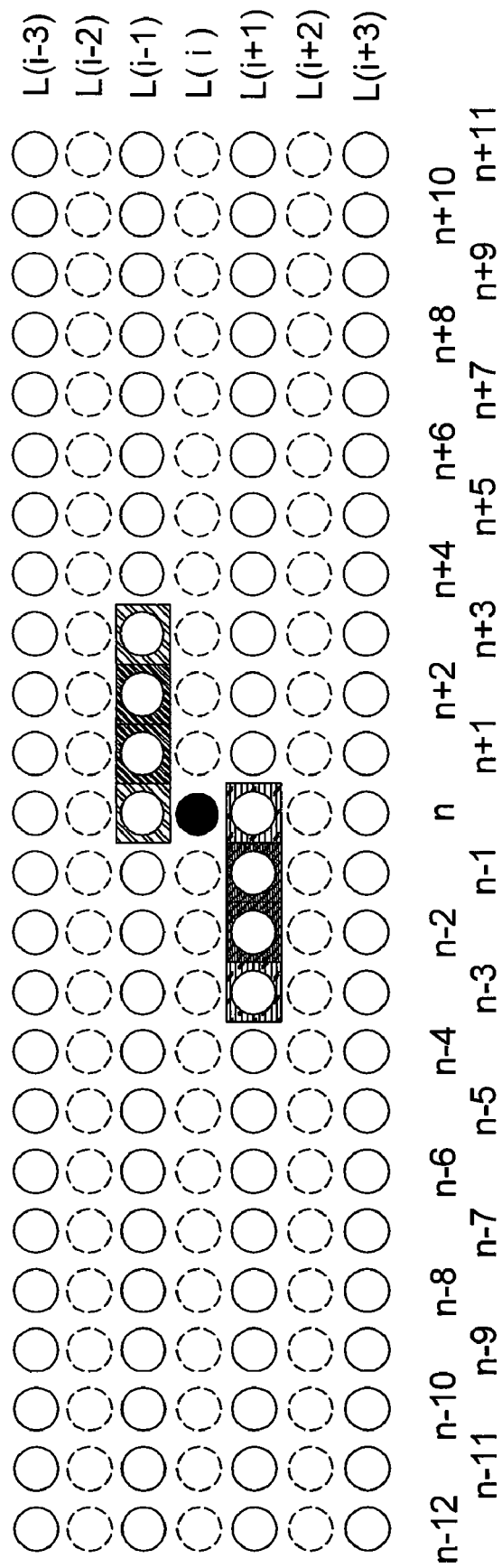
FIG. 1 shows a schematic diagram illustrating the relationship between the original scan lines and missing scan lines during the deinterlacing process in a local area of a field.

FIG. 1 shows a schematic diagram illustrating the relationship between the original scan lines and missing scan lines during the deinterlacing process in a local area of a field. Referring to FIG. 1, each circle represents a pixel and there are four rows of circles with solid lines showing the original scan lines (having Y, U, V components) while there are three rows of circles with dashed lines showing the missing scan lines to be interpolated in the field.

Figure 2:
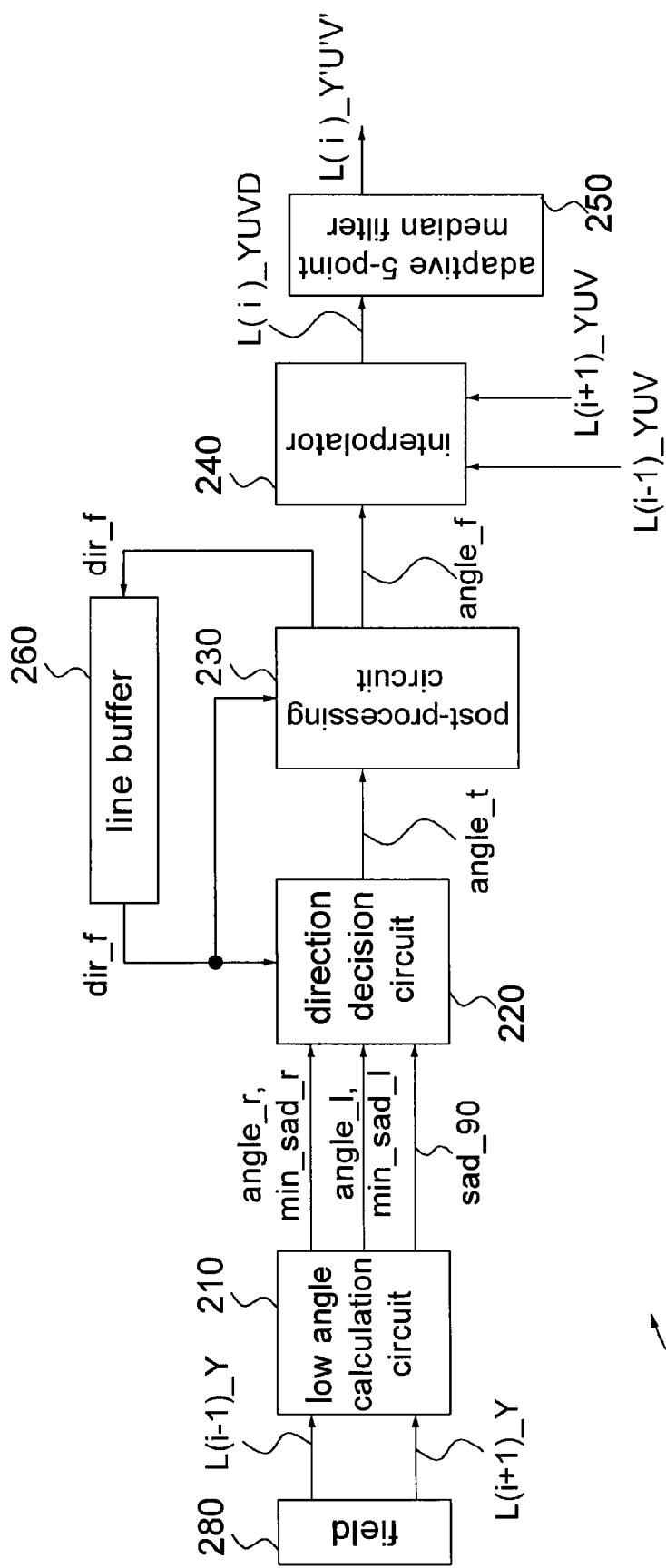
FIG. 2 shows a schematic diagram illustrating a low angle interpolation apparatus according to one embodiment of the invention.

FIG. 2 shows a schematic diagram illustrating a low angle interpolation apparatus according to one embodiment of the invention. Referring to FIG. 2, the low angle interpolation apparatus 200 according to the invention includes a low angle calculation circuit 210, a direction decision circuit 220, a post-processing circuit 230, an interpolator 240, an adaptive 5-point median filter 250 and a line buffer 260. The low angle interpolation apparatus 200 receives any two neighboring original scan lines (e.g., L(i−1) and L(i+1) in FIG. 1) of a field 280 (There are 240 scan lines, with each scan line including 720 pixels and each pixel including Y, U, V components in each field according to NTSC standard.) to generate an interpolated scan line (e.g., L(i) in FIG. 1) between the two original scan lines L(i−1) and L(i+1).

Figure 3A:
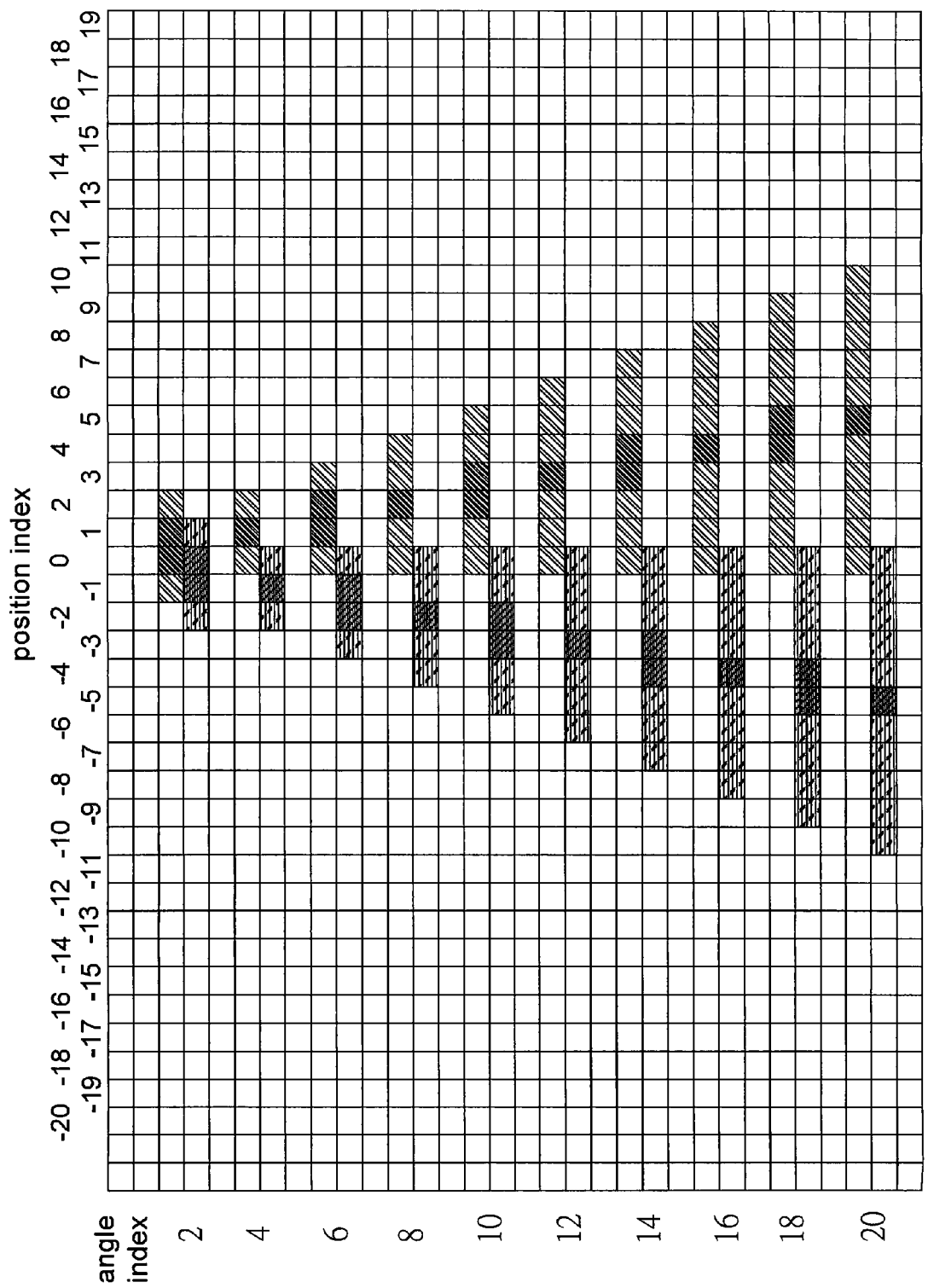
FIG. 3A and FIG. 3B show the counterclockwise operating matrix and the clockwise operating matrix, respectively, according to one embodiment of the invention
Figure 3B:
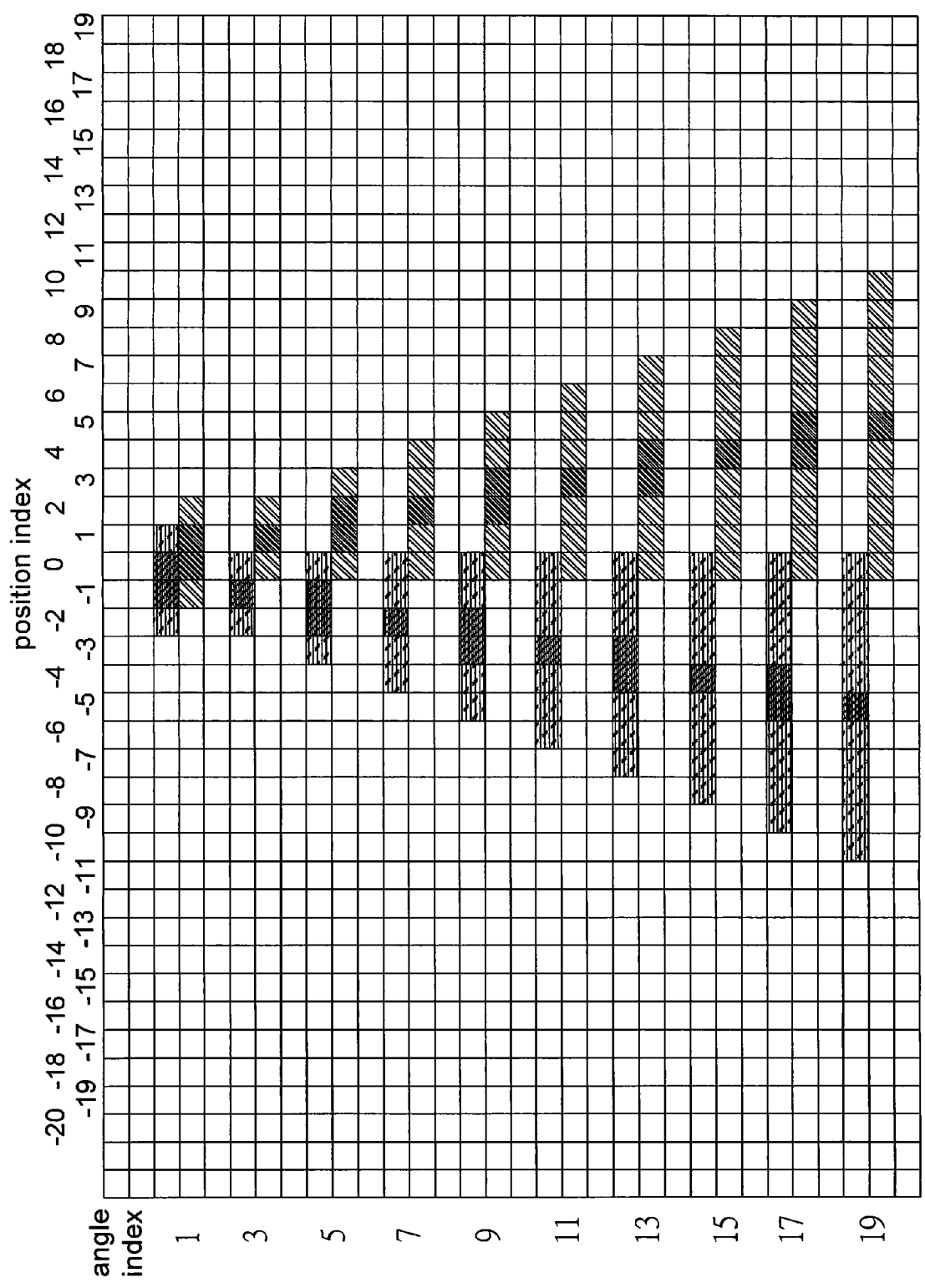

FIG. 3A and FIG. 3B show a counterclockwise operating matrix and a clockwise operating matrix, respectively, according to one embodiment of the invention. Each of horizontal axes in FIGS. 3A and 3B represents the pixel position index where a position index of 0 is aligned to a interpolation pixel (e.g., p(i,n) in FIG. 1) whose sum of absolute differences (SAD) with respect to each angle will be calculated in the interpolated scan line L(i). In the embodiment in FIGS. 3A and 3B, there are 10 different angle index values on each of vertical axes. As the angle index value is getting less, the angle is closer to 90 degrees with respect to a horizontal line through the interpolation pixel p(i,n). As the angle index value is getting larger, the angle is lower and closer to zero degree with respect to the horizontal line. It should be noted that the angle index value further includes the interpolation direction information. For example, the angle index values in FIG. 3A are all even numbers, denoting the angle in a counterclockwise direction with respect to the horizontal line through the interpolation pixel (e.g., p(i,n) in FIG. 1). In contrast, the angle index values in FIG. 3B are all odd numbers, denoting the angle in a clockwise direction with respect to a horizontal line through the interpolation pixel (e.g., p(i,n) in FIG. 1). As the angle index value equals 0, the angle is 90 degrees. Each angle index value corresponds to an angle matrix and each angle matrix consists of a pair of upper and lower matrixes. Referring now FIGS. 1, 3A and 3B, a SAD of the interpolation pixel p(i,n) with respect to a specified angle is obtained by applying the corresponding pair of upper and lower matrixes to the upper scan line L(i−1) and the lower scan line L(i+1) respectively. As can be observed from FIG. 3A and FIG. 3B, the shapes of the counterclockwise operating matrix and the clockwise operating matrix look like triangles; besides, as the angle index value is larger, its corresponding upper matrix and lower matrix have wider widths and contain more reference pixels. Accordingly, unless a low-angle edge is really located, it is not easy to select the low angle from all the angles after all the SADs are obtained. As the widths of the upper matrix and the lower matrix are odd numbers, each matrix has one dark point as the center. As the widths of the upper matrix and the lower matrix are even numbers, each matrix has two dark points as the center. These dark points are used as the reference points in the interpolator 240 when the corresponding angle index values are determined as the final interpolation angles.

It should be noted that, in the above embodiment, the vertical axes in FIGS. 3A and 3B are respectively divided into 10 different angles, but the invention is not limited to this specific arrangement. As long as the shapes of the counterclockwise operating matrix and the clockwise operating matrix resemble triangles, the slopes and the angle index values of the counterclockwise operating matrix and the clockwise operating matrix may be modified and practiced without departing from the spirit of the invention.

The low angle calculation circuit 210 receives luminance values (expressed by L(i−1)_Y and L(i+1)_Y in FIG. 2) of all pixels of the two original neighboring scan lines L(i−1) and L(i+1) of the field 280. According to the counterclockwise operating matrix in FIG. 3A and the clockwise operating matrix in FIG. 3B, for every pixel in the interpolated scan line L(i) (from left to right, a total of 720 pixels), the 90-degree SAD sad_n, the SADs of ten different angles in the counterclockwise direction and the SADs of ten different angles in the clockwise direction are calculated in the low angle calculation circuit 210. By comparing the SADs of ten different angles in the counterclockwise direction and the SADs of ten different angles in the clockwise direction, the minimum counterclockwise SAD min_sad_r and its corresponding angle angle_r, the minimum clockwise SAD min_sad_l and its corresponding angle angle_l, and the 90-degree SAD sad_n are obtained. Throughout this specification, the angles angle_r, angle_l, angle_lr, angle_t, and angle_f are expressed by the angle index value.

Hereinafter, the operation that low angle calculation circuit 210 generates the counterclockwise SAD sad_r and the 90-degree SAD sad_n will be described in detail in connection with the counterclockwise operating matrix in FIG. 3A. Take the SAD calculation of the angle-6 in the counterclockwise direction with respect to the $n^{th}$ pixel (i.e., p(i,n)) of the interpolated scan line L(i) in FIG. 1 for example. According to the counterclockwise operating matrix in FIG. 3A, the angle-6 matrix comprises a pair of upper and lower matrixes with a width of 4. The upper matrix is applied to the pixels p(i−1,n)~p(i−1,n+3) of the scan line L(i−1) while the lower matrix is applied to the pixels p(i+1,n−3)~p(i+1,n) of the scan line L(i+1). The angle-6 SAD sad_r(6) of the pixel p(i,n) in FIG. 1 herein refers to the sum of the absolute luminance differences of pixel pairs representing the same angle with respect to the horizontal line and may, for example, be calculated as follows: sad_r(6)=abs(y(i−1,n+3)−y(i+1,n))+abs(y(i−1,n+2)−y(i+1,n−1))+abs(y(i−1, n+1)−y(i+1,n−2))+abs(y(i−1,n)−y(i+1,n−3)). With respect to other angles except 90 degrees, the SADs are calculated as follows:

$$sad\_r(2) = \left(\sum_{m=-1}^{2} abs(y(i-1, n+m) - y(i+1, n+m-1))\right) * w$$

$$sad\_l(2) = \left(\sum_{m=-2}^{1} abs(y(i-1, n+m) - y(i+1, n+m+1))\right) * w$$

for k = 2:10

$$sad\_r(2*k) = \sum_{m=0}^{k} abs(y(i-1, n+m) - y(i+1, n+m-k))$$

$$sad\_l(2*k-1) = \sum_{m=0}^{k} abs(y(i-1, n+m-k) - y(i+1, n+m))$$

end w = 0.75

The 90-degree SAD of the pixel p(i,n) in FIG. 1 is calculated as follows:

sad_n=abs(y(i−1,n−1)−y(i+1,n−1))×w0+abs(y(i−1,n)−y(i+1,n))×w1+abs(y(i−1,n+1)−y(i+1,n+1))×w2   (1).

According to this embodiment, w0=w2=0.25 and w1=0.5. In an alternate embodiment, the parameters w0, w1, and w2 can be adjusted according to the image contents.

The low angle calculation circuit 210 uses three compensation units to compensate for the ten counterclockwise SADs sad_r(2)~sad_r(20), the ten clockwise SADs sad_l(1)~sad_l(19), and the 90-degree SAD sad_n and then compares the SAD values. The three compensation units (not shown) will be described below.

Figure 4:
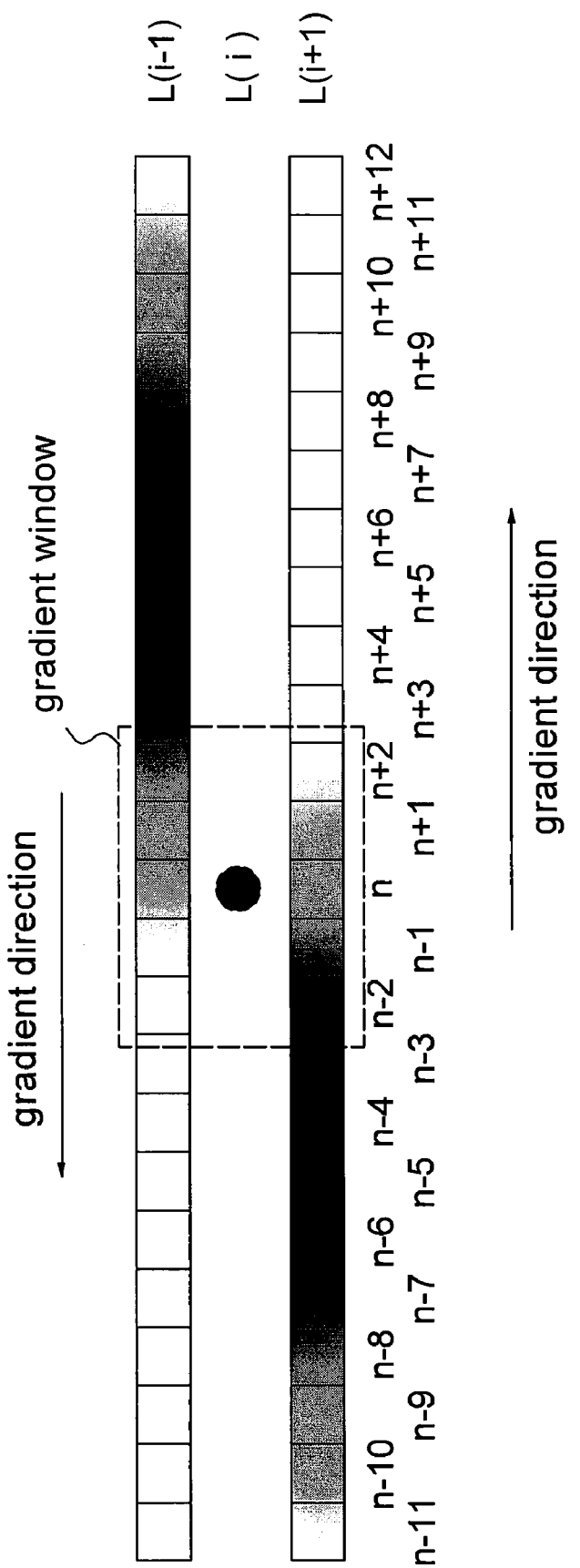
FIG. 4 shows a schematic diagram illustrating an exemplary portion of the scan lines L(i−1) and L(i+1) having mutually opposite luminance gradients.

The first one is a gradient compensation unit to be applied to the 90-degree SAD compensation. FIG. 4 shows a schematic diagram illustrating a exemplary portion of the scan lines L(i−1) and L(i+1) having mutually opposite luminance gradients. Referring to FIG. 4, the scan lines L(i−1) and L(i+1) have mutually opposite luminance gradients (that is, the scan line L(i−1) have continuously decreasing luminance values and the scan line L(i+1) have continuously increasing luminance values from left to right) with similar luminance values around the pixel p(i,n). Although a clear edge having an angle in the counterclockwise direction can be observed, the sad_n value is usually small if the sad_n value is obtained according to the equation (1). Accordingly, the direction decision circuit 220 likely selects the 90-degree direction as the temporary interpolation direction dir_t After interpolation, the interpolated luminance of the pixel p(i,n) will be close to white and the edge in the counterclockwise direction looks like broken and discontinuous. In order to avoid this problem, a gradient compensation value sad_nc is added to the above sad_n value, where sad_nc(i,n)=abs((y(i−1,n−2)−y(i−1,n−1))−(y(i+1,n−2)−y(i+1,n−1))×w3+abs((y(i−1,n−1)−y(i−1,n))−(y(i+1,n−1)−y(i+1,n))×w4+abs((y(i−1,n)−y(i−1,n+1))−(y(i+1,n)−y(i+1,n+1))×w4+abs((y(i−1,n+1)−y(i−1,n+2))−(y(i+1,n+1)−y(i+1,n+2))×w3   (2).

In the equation (2), the parameters w3 and w4 can be adjusted according to the image contents. When a luminance gradient occurs in the scan lines L(i−1) and L(i+1), the gradient compensation value sad_nc is obtained by calculating the sum of absolute luminance differences between the pixel pair in the horizontal direction and the pixel pair in vertical direction within a gradient window having a width of 5. The gradient compensation value sad_nc is used to compensate the sad_n value. As the scan lines L(i−1) and L(i+1) show mutually opposite luminance gradients, the sad_nc value tends to be large to make the compensated 90-degree SAD (sad_n=sad_n+sad_nc) become larger and to thereby minimize the possibility that the direction decision circuit 220 selects the 90-degree direction. Contrarily, the possibility of selecting a low-angle direction is increased so as to avoid the above discontinuous edge. On the other hand, if the scan lines L(i−1) and L(i+1) show no luminance gradient or have luminance gradients in the same direction ((that is, the scan lines L(i−1) and L(i+1) have continuously decreasing luminance values or increasing luminance values in the same direction)), the sad_nc value tends to be small, which will not badly affect the possibility that the direction decision circuit 220 selects the 90-degree direction. In an alternate embodiment, the sad_nc value is compared with a threshold value and the sad_nc value will be replaced with the threshold value if the sad_nc value is greater than the threshold value in order to avoid over-compensation. It should be noted that the width of the gradient window is adjustable depending on applications.

Figure 5A:
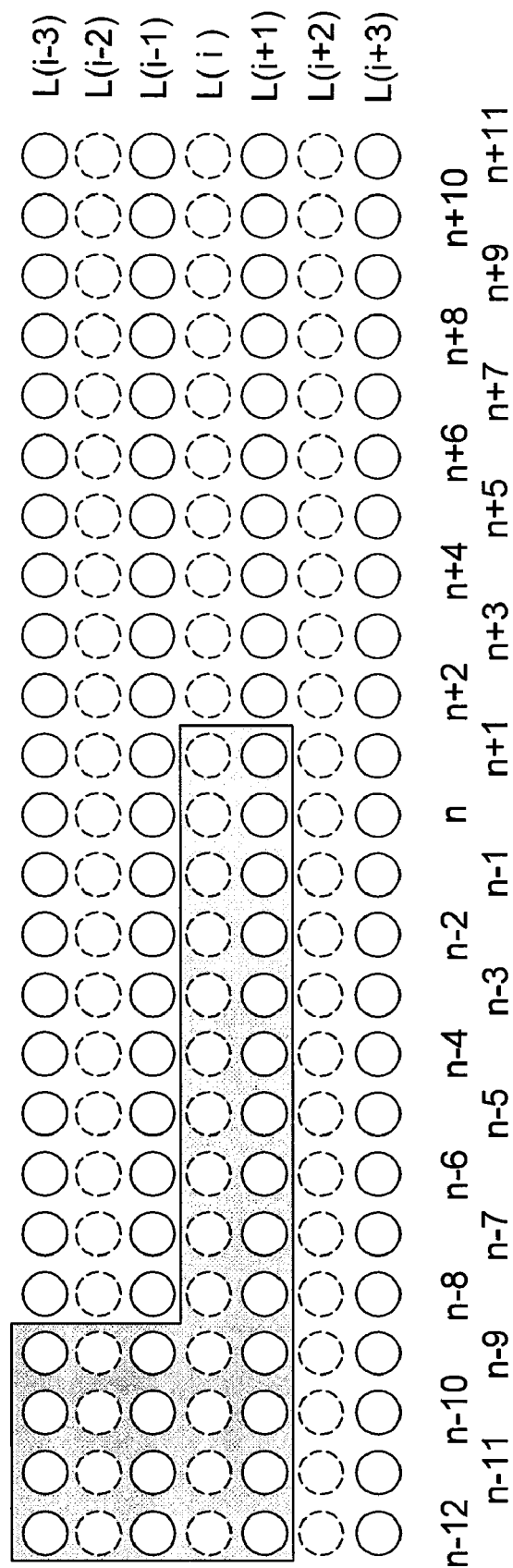
FIG. 5A shows a schematic diagram illustrating an ideal image after a broken-angle compensation.
Figure 5B:
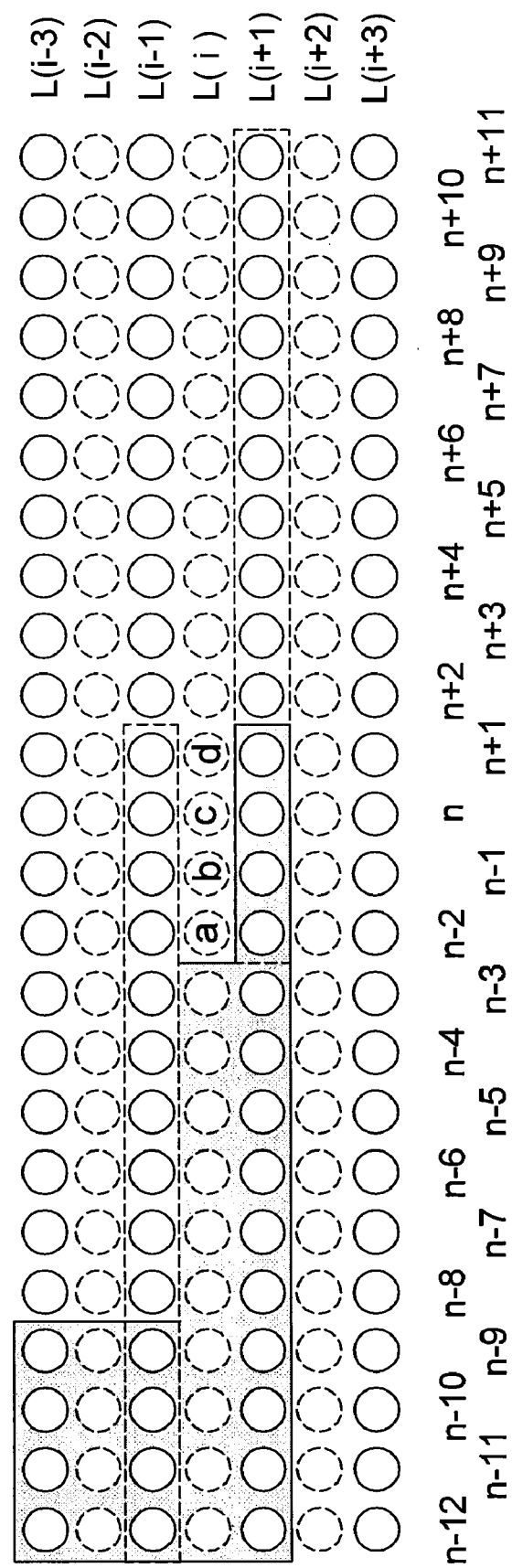
FIG. 5B shows a schematic diagram illustrating an interpolated image without the broken-angle compensation.
Figure 5C:
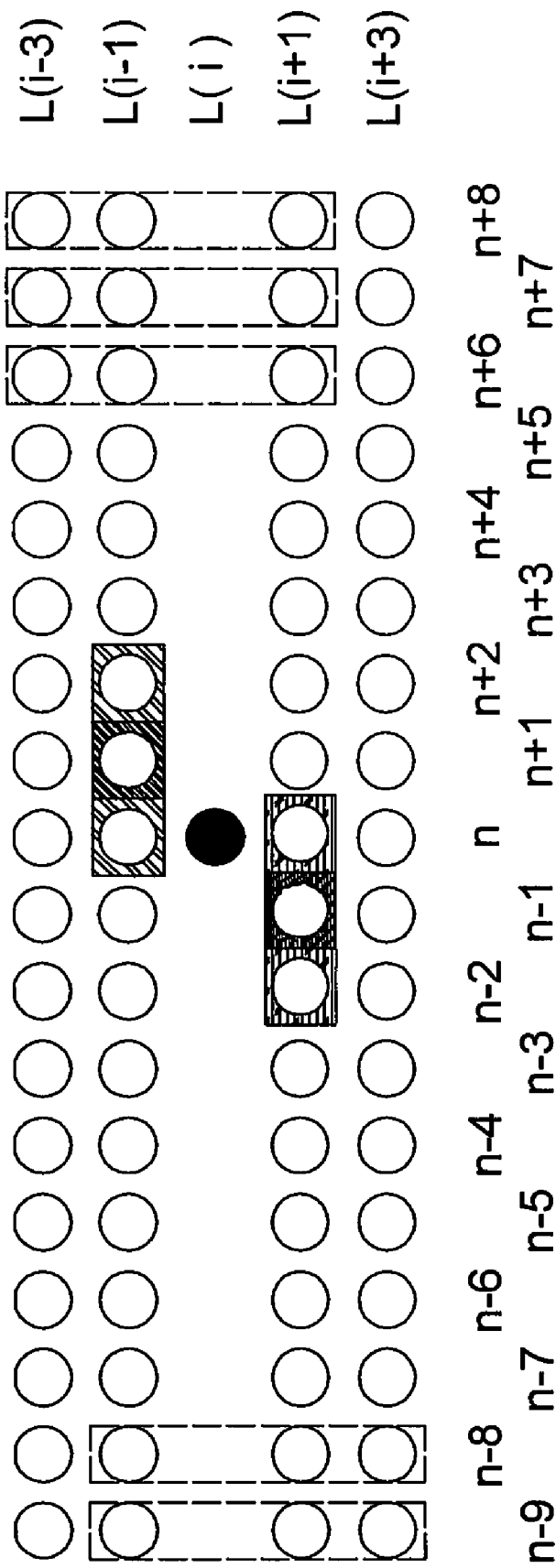
FIG. 5C shows a schematic diagram illustrating the example of one edge and its two ends.

The second compensation unit is a broken-angle compensation unit to be applied to the counterclockwise SAD compensation and the clockwise SAD compensation. FIG. 5A shows a schematic diagram illustrating an ideal image after a broken-angle compensation while FIG. 5B shows a schematic diagram illustrating an interpolated image without the broken-angle compensation. Referring to the example in FIG. 5B without no broken-angle compensation, when the SADs are compared with respect to the pixels a, b, c, and d, the clockwise SADs sad_l are usually determined to be the minimum and then the pixels a, b, c, and d become white after interpolation, thereby forming a broken angle at the boundary of the L-shaped edge. FIG. 5C shows a schematic diagram illustrating the example of one edge and its two ends. In order to detect whether a pixel is at the end of the edge or not (that is, broken-angle detection), the absolute luminance differences between three vertical pixels of three scan lines, as represented in the dashed-line rectangles in FIG. 5C. Take the pixel p(i−1, n+6) for example. According to the invention, if the absolute luminance difference between pixels p(i−1, n+6) and p(i−3, n+6) and the absolute luminance difference between p(i−1, n+6) and p(i+1, n+6) are both smaller than a threshold value th1, i.e., abs(y(i−3,n+6)−y(i−1,n+6))<th1 && abs(y(i−1,n+6)−y(i+1,n+6))<th1, the pixel p(i−1, n+6) will be treated as the end of the edge and its broken-angle flag will be set to 1 (that is, break(i−1, n+6)=1); otherwise, the broken-angle flag is set to 0, i.e., break(i−1, n+6)=0.

Ten counterclockwise sad_r values and ten clockwise sad_l values of each pixel in the interpolated scan line L(i) are calculated by using twenty sets of the upper matrix and the lower matrix with different widths. According to the invention, the more the windows of one set of the upper matrix and the lower matrix highly overlaps with either one end of the edge, the higher the possibility of a broken angle. Thus, it is necessary to evaluate the degree that the windows of the upper and lower matrixes overlap with either one end of the edge for each angle, that is, to accumulate the broken-angle flag values of all the pixels within the windows of the upper and lower matrixes for every angle to compensate the SAD of the corresponding angle. Regarding the example shown in FIG. 5B, in order to reduce the possibility that the direction decision circuit 220 selects an angle in the clockwise direction, the clockwise SADs sad_l with respect to the pixels a, b, c and d should be compensated to avoid the above-mentioned broken-angle problem. For example, in the case of compensating the sad_r(4) value of the pixel p(i,n) in FIG. 5C, according to the counterclockwise operating matrix in FIG. 3A, the angle-4 matrix comprises a pair of the upper matrix and the lower matrix having a width of 3. The broken-angle flag values of p(i−1,n), p(i−1, n+1), and p(i−1, n+2) within the window of the upper matrix and the broken-angle flag values of p(i+1,n−2), p(i+1, n−1), and p(i+1, n) within the window of the lower matrix are accumulated to compensate the sad_r(4) value of the pixel p(i,n). The compensation is made as follows:

```
   sad_c(4) = (break(i−1,n) + break(i−1,n+1) +
break(i−1,n+2) + break(i+1,n) + break(i+1,n−1) + break(i+1,n−2));
   if (sad_c(4) > break_th1(4))
       sad_r(4) = sad_r(4)+ (sad_c(4) * break_th2);
   else
       sad_r(4) = sad_r(4);
```

Here, the threshold value break_th1 is a function of angle index, meaning that different angles correspond to different sum of broken-angle flag values. Besides, the compensated value sad_c will be added to sad_r on condition that it is greater than the threshold value break_th1. Since the compensation for other angles except 90 degrees is made in the same manner, the detail will not be further described.

The third compensation unit is a slope compensation unit to be applied to the SAD compensation for all the angles. It should be noted that the slope compensation is optional and applied in some specific cases. For example, if the counterclockwise operating matrix of FIG. 3A and the clockwise operating matrix of FIG. 3B have pre-set steep slopes or highly slanted slopes and the slopes are implemented by hardware and hard to be altered, the slope compensation can be introduced. If the slopes of the counterclockwise and clockwise operating matrixes are highly slanted (i.e., the widths of the upper matrix and the lower matrix are too wide), the low-angle edge seems not easy to be selected. At the time, an effect of inversely adjusting the slopes of the counterclockwise and clockwise operating matrixes can be achieved by modifying the SADs of each angle. According to one embodiment, the following program codes are provided to inversely adjust the slopes of the counterclockwise and clockwise operating matrixes:

```
   sad_n= sad_n+10 × step;
   for i=1 to 10
       sad_r(2×i)= sad_r (2×i)+(10−i) × step;
       sad_l(2×i−1) = sad_l(2×i−1) + (10−i) × step;
   end
```

As can be found from the above equations, if the angle index value is larger, the compensation value (i.e., (10−i)× step, where step is a pre-set value and adjustable) is smaller and thus the slopes of the clockwise operating matrix and the counterclockwise operating matrix become steeper (that is, the bottom of the triangle becomes narrow). Accordingly, the low angle is easier to be selected. On the contrary, in the case of the clockwise operating matrix and the counterclockwise operating matrix having steep slopes, another set of equations can be designed to have the compensation value be larger if the angle index value is larger to thereby achieve the effect of inversely adjusting the slopes of the clockwise operating matrix and the counterclockwise operating matrix and have the low angle be selected less easily.

After the compensation of the above three compensation units, for each pixel of the interpolated scan line L(i) from left to right, the low angle calculation circuit 210 compares ten different counterclockwise SADs sad_r to obtain the minimum counterclockwise SAD min_sad_r and its corresponding angle angle_r and compares ten different clockwise SADs sad_l to obtain the minimum counterclockwise SADs min_sad_l and its corresponding angle angle_l to thereby output min_sad_r, angle_r, min_sad_l, angle_l, and sad_n pixel by pixel to the direction decision circuit 220.

The line buffer 260 is provided to store the final interpolation directions dir_f of all the pixels of the preceding interpolated scan line L(i−2). In this embodiment, two bits are provided for each pixel to denote one of three final interpolation directions: the angle in the counterclockwise direction, the angle in the clockwise direction, and the 90-degree direction. Thus, the size of the line buffer 260 has to be larger than or equal to 720×2 bits.

Figure 6:
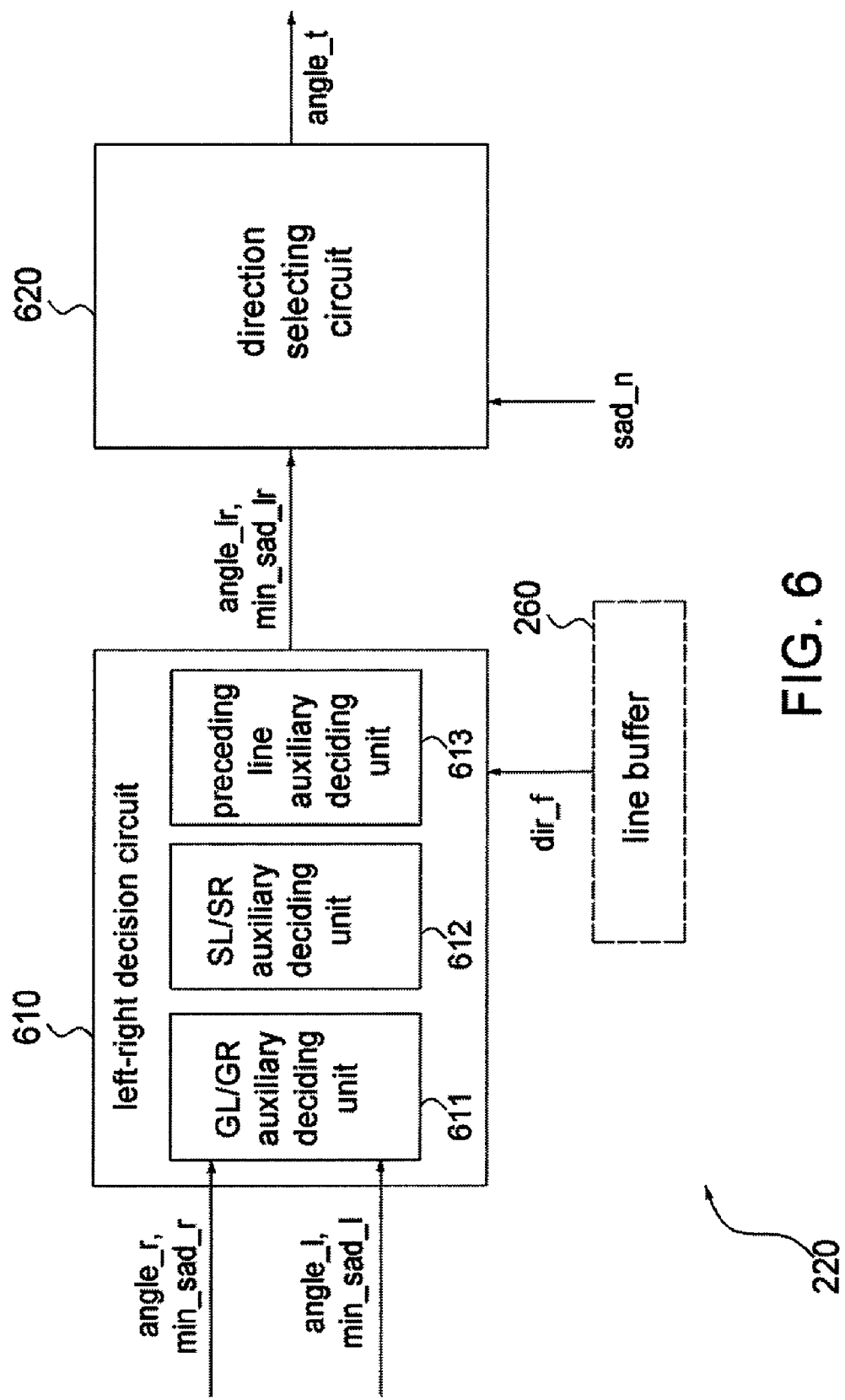
FIG. 6 shows a schematic diagram illustrating the direction decision circuit according to one embodiment of the invention.

FIG. 6 shows a schematic diagram of the direction decision circuit according to one embodiment of the invention. Referring to FIG. 6, the direction decision circuit 220 comprises a left-right decision circuit 610 and a direction selecting circuit 620. In the direction decision circuit 220, temporary interpolation angles angle_t of all the pixels in the interpolated scan line L(i) are determined pixel by pixel according to min_sad r, min_sad_l, angle_r, angle_l, and sad_n of all the pixels in the interpolated scan line L(i) and the final interpolation directions dir_f of all the pixels in the preceding interpolated scan line L(i−2) stored in the line buffer 260. After receiving min_sad_r and min_sad_l of each pixel of the interpolated scan line L(i), the direction decision circuit 220 assigns a corresponding direction flag (SR, GR, WR, SL, GL, or WL) to each pixel according to the following six different equations:

$SR => \text{min\_sad\_}l > (\text{min\_sad\_}r + \text{big\_dif})$ $GR => \text{min\_sad\_}l > (\text{min\_sad\_}r + \text{normal\_dif})$ $WR => (\text{min\_sad\_}l > \text{min\_sad\_}r) \&\& (\text{min\_sad\_}l <= (\text{min\_sad\_}r + \text{normal\_dif}))$ $SL => \text{min\_sad\_}r > (\text{min\_sad\_}l + \text{big\_dif})$ $GL => \text{min\_sad\_}r > (\text{min\_sad\_}l + \text{normal\_dif})$ $WL => (\text{min\_sad\_}r > \text{min\_sad\_}l) \&\& (\text{min\_sad\_}r <= (\text{min\_sad\_}l + \text{normal\_dif}))$ Here, the parameter big_dif is larger than the parameter normal_dif. The intensity order of the clockwise flags is SL>GL>WL and the intensity order of the counterclockwise flags is SR>GR>WR.

In terms of the pixels of a whole row just assigned direction flags, the interpolation direction of a pixel can be directly determined to be clockwise if the intensity of its direction flag is beyond SL or GL; the interpolation direction of a pixel can be directly determined to be counterclockwise if the intensity of its direction flag is beyond SR or GR. If the intensity of the direction flag is WL or WR, the direction flag is relatively weak and thus the following three deciding units will be provided for determination.

In a GL/GR auxiliary deciding unit 611, the interpolation directions of x consecutive pixels having GL (or GR) affect the interpolation directions of the following y consecutive pixels having WL (or WR), where x and y are adjustable. In the case of FIG. 7A, assuming x=y=3 and the scan line is processed from left to right, three consecutive pixels (a3~a5) having GL are found first and the interpolation directions of the pixels (a3~a5) are directly determined to be clockwise (L). Then, the effectiveness of the clockwise direction of the pixels (a3~a5) is be extended to the following three consecutive pixels (a6~a8) having WL (or WR). As shown in FIGS. 7A and 7B, the question mark (?) represents that the interpolation direction is undecided. In the case of FIG. 7B, three consecutive pixels having GL cannot be found and thus the interpolation directions of the pixels having WL or WR cannot be determined.

Figure 7C:
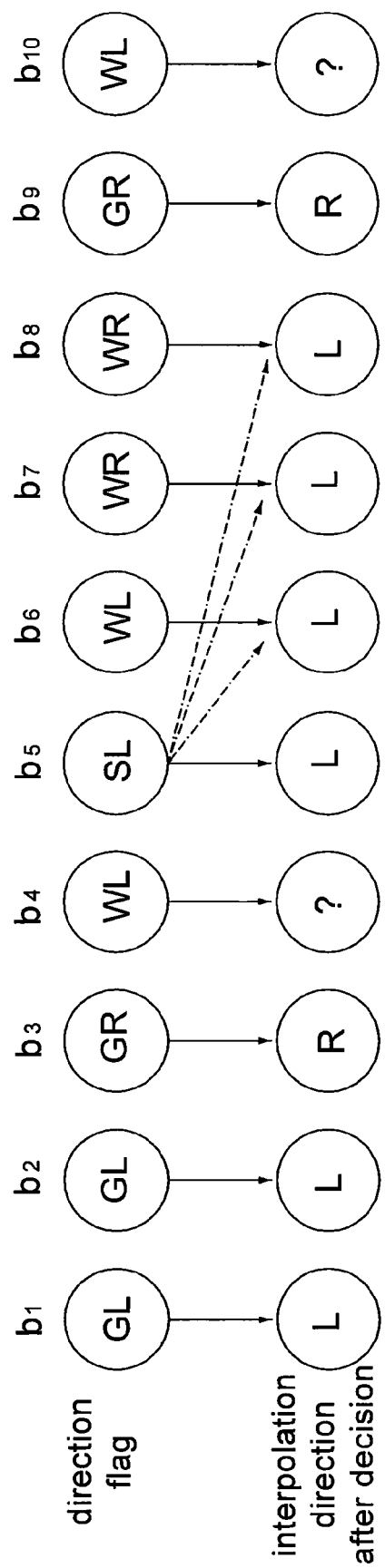
FIG. 7C shows a schematic diagram illustrating that the clockwise effectiveness of the three consecutive pixels having SL can be extended to the following three consecutive pixels having WL.

In a SL/SR auxiliary deciding unit 612, the interpolation direction of one pixel having SL (or SR) affects the interpolation directions of the following z consecutive pixels having WL (or WR) where z is adjustable. In the case of FIG. 7C, assuming z=3 and the scan line is processed from left to right, a pixel (b5) having SL is found first and the interpolation direction of the pixel (b5) is directly decided to be clockwise (L). Then, the effectiveness of the clockwise direction of the pixel (b5) is extended to the following three consecutive pixels (b6~b8) having WL.

Figure 7D:
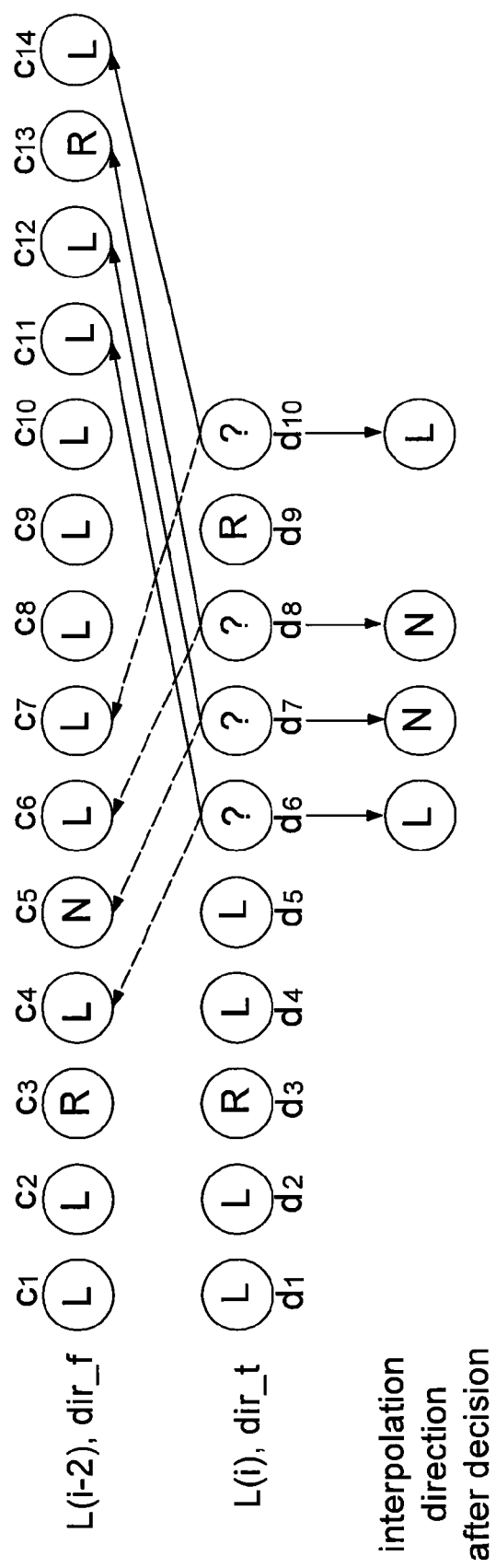
FIG. 7D shows a schematic diagram illustrating that the final interpolations dir_f of all the pixels of the preceding interpolated scan line L(i−2) stored in the line buffer 260 are used to determine the undecided interpolation directions of the pixels in the interpolated scan line L(i).

A preceding line auxiliary deciding unit 613 uses the final interpolation directions dir_f of all the pixels of the preceding interpolated scan line L(i−2) stored in the line buffer 260 to determine the interpolation direction of the pixel whose interpolation direction is still undecided. In the case of the pixel (d6) in FIG. 7D, if a pixel search is conducted along the angle (min_angle_l) in the clockwise direction, a pixel (c4) will be found and its interpolation direction is clockwise (L); besides, if a pixel search is conducted along the angle (min_angle_r) in the counterclockwise direction, a pixel (c11) will be found and its interpolation direction is also clockwise. Apparently, the left hand side is correct but the right hand side is wrong. Thus, the interpolation direction of the pixel (d6) is clockwise. In the case of the pixel (d7), if a pixel search is conducted along the angle in the clockwise direction, a pixel (c5) will be found and its interpolation direction is the 90-degree direction (N); besides, if a pixel search is conducted along the angle in the counterclockwise direction, a pixel (c12) will be found and its interpolation direction is clockwise. Apparently, the left hand side and the right hand side are both wrong. Thus, the interpolation direction of the pixel (d7) will be set to the 90-degree direction (N). In the case of the pixel (d8), if a pixel search is conducted along the angle in the clockwise direction, a pixel (c6) will be found and its interpolation direction is clockwise; besides, if a pixel search is conducted along the angle in the counterclockwise direction, a pixel (c12) will be found and its interpolation direction is counterclockwise (R). Apparently, the left hand side and the right hand side are both correct. Thus, the interpolation direction of the pixel (d8) will be set to the 90-degree direction (N).

Next, according to the interpolation direction of each pixel of the interpolated scan line L(i) decided by the three units 611~613, the left-right decision circuit 610 selects min_sad_lr and its angle angle_lr corresponding to the interpolation direction from the inputs min_sad_r, min_sad_l angle_r, and angle_l to be delivered to the direction selecting circuit 620. Then, in the direction selecting circuit 620, min_sad_lr and sad_n are compared pixel by pixel to select the minimum value as sad_t and store its corresponding angle angle_t. Finally, the direction selecting circuit 620 determines whether sad_t is larger than a predetermined value max_sad (angle_t) or not and then sets the temporary interpolation angle angle_t to 90 degrees if sad_t is larger than max_sad (angle_t).

It should be noted that the predetermined value max_sad (angle_t) is a function of angles (angle_t), where the max_sad value depends on the angle_t value. According to the circuit shown in FIG. 6, the GL/GR auxiliary deciding unit 611, the SL/SR auxiliary deciding unit 612 and the preceding line auxiliary deciding unit 613 operate and are arranged in an ascending sequence of their reference numbers. In an alternate embodiment, the GL/GR auxiliary deciding unit 611 can be exchanged with and the SL/SR auxiliary deciding unit 612. In another alternate embodiment, the GL/GR auxiliary deciding unit 611 and the SL/SR auxiliary deciding unit 612 operate in parallel.

Figure 8:
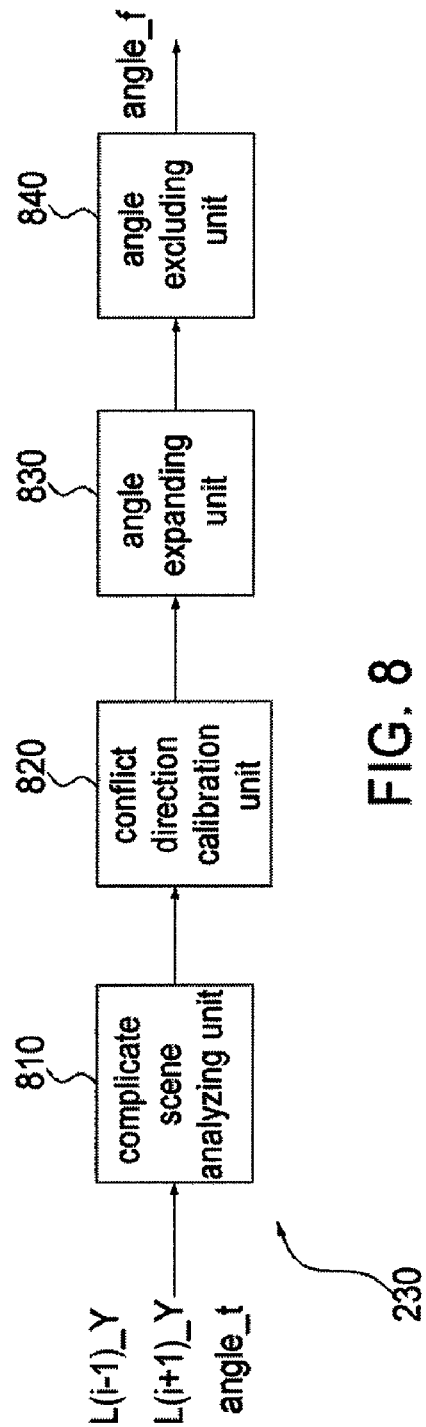
FIG. 8 shows a schematic diagram illustrating the post-processing circuit according to one embodiment of the invention.

FIG. 8 shows a schematic diagram of the post-processing circuit according to one embodiment of the invention. The post-processing circuit 230 comprises a complicate scene analyzing unit 810, a conflict direction calibration unit 820, an angle expanding circuit 830 and an angle excluding circuit 840. According to the temporary interpolation angles angle_t of all the pixels in the interpolated scan line L(i) and the final interpolation directions dir_f of all the pixels of the preceding interpolated scan line L(i−2), the post-processing circuit 230 performs calibration on the interpolation direction and determines the final interpolation angle angle_f and the final interpolation direction dir_f for each pixel in the interpolated scan line L(i). As shown in FIG. 2, the post-processing circuit 230 finally stores the final interpolation direction dir_f of each pixel of the interpolated scan line L(i) in the line buffer 260 and transmits the final interpolation angle angle_f of each pixel of the interpolated scan line L(i) to the interpolator 240.

Figure 9:
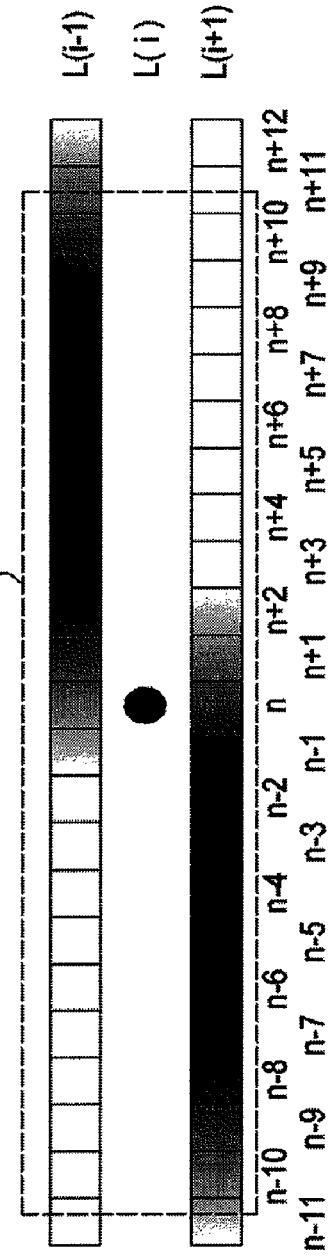
FIG. 9 shows an example of a scene window having a pixel p(i,n) as the center and having a width of 21 points.

The complicate scene analyzing unit 810 receives the temporary interpolation angles angle_t of all the pixels in the interpolated scan line L(i) and the luminance values (Y) of all the pixels of the scan lines L(i−1) and L(i+1). According to the width of a scene window in FIG. 9, by treating the pixel p(i,n) of the interpolated scan line L(i) as the center, the complicate scene analyzing unit 810 accumulates the absolute luminance differences of the scan lines L(i−1) and L(i+1) in the horizontal direction. If the accumulated absolute luminance differences is greater than a threshold value th2, a complicate scene will be determined and the temporary interpolation angle angle_t of the pixel p(i,n) will be set to 90 degrees in the complicate scene analyzing unit 810. In the case of the example in FIG. 9, the pixel p(i,n) is the center of the scene window and the width of the scene window equals (2 m+1) points (m=10, m is adjustable). In terms of each pixel along the scan lines L(i−1) and L(i−2), a YD value is obtained by calculating the sum of the absolute luminance differences between the pixel, its right neighbor and its left neighbor and then the minimum between the YD value and the threshold value th3 is selected for accumulation. The following equation is provided to obtain the accumulated absolute luminance difference:

$$YD\_sum = \sum_{j=-m}^{m} [\lim(abs(y(i-1, n+j) \times 2 - y(i-1, n+j-1) - y(i-1, n+j+1)), th3) + \lim(abs(y(i+1, n+j) \times 2 - y(i+1, n+j-1) - y(i+1, n+j+1)), th3)].$$

If the accumulated absolute luminance difference YD_sum is greater than the threshold value th2, a complicate scene within the scene window is determined and thus the temporary interpolation angle angle_t of the pixel p(i,n) is set to 90 degrees. On the contrary, if YD_sum is less than the threshold value th2, a simple scene within the scene window is determined and thus the temporary interpolation angle angle_t of the pixel p(i,n) remains unchanged.

Figure 10A:
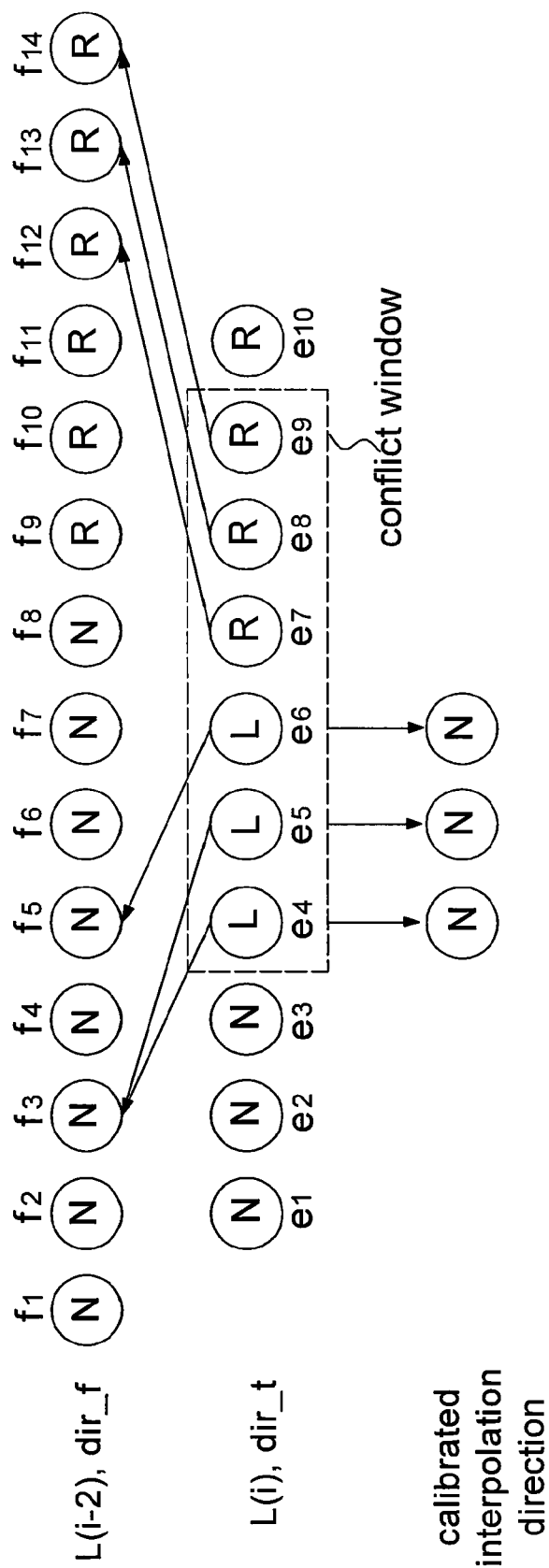
FIG. 10A shows an example of a conflict window fitting an "LR" conflict pattern.

The conflict direction calibration unit 820 receives the temporary interpolation angles angle_t of all the pixels in the interpolated scan line L(i) and the final interpolation directions dir_f of all the pixels in the preceding interpolated scan line L(i−2) to calibrate the pixels having the conflict interpolation directions in the interpolated scan line L(i). In view of general image characteristic, the interpolation directions of an interpolated scan line are hardly likely to be immediately changed from counterclockwise (R) to clockwise (L) (or from clockwise to counterclockwise), so the conflict interpolation directions includes six conflict patterns: LR, RL, LNR, RNL, LNNR, and RNNL. As long as the interpolation directions of consecutive pixels fit one of the six conflict patterns, the interpolation directions need to be reconfirmed. The case in FIG. 10A describes the pixels fit an "LR" conflict pattern. After finding out the boundary between L and R along the interpolated scan line L(i), the conflict direction calibration unit 820 has the boundary as a center line, draws a symmetric conflict window, and thus confirms the interpolation directions of the pixels (e4~e9) within the conflict window. Two pixels f3 and f5 having direction flags of N are found if three pixel searches are conducted from the pixels e4, e5 and e6 along their temporary interpolation directions (L, clockwise). The temporary interpolation directions of the pixels e4 and e5 are wrong and thus should be changed to the 90-degree direction (N). On the other hand, if three pixel searches are conducted from the pixels e7~e9 along their temporary interpolation directions (R, counterclockwise), three pixels f12~f14, each having a direction flag of R, will be found. The temporary interpolation directions of the pixels e7~e9 are obviously correct and thus remain unchanged.

Figure 10B:
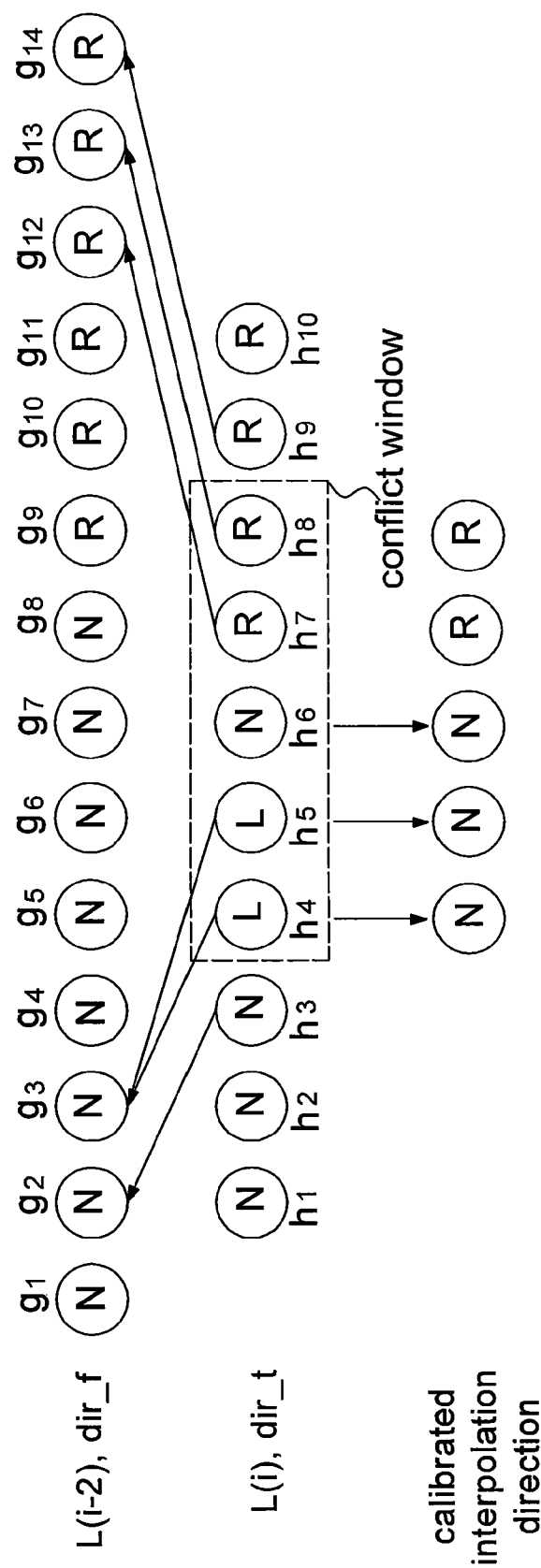
FIG. 10B shows another example of the conflict window fitting an "LNR" conflict pattern.

In addition, the case in FIG. 10B describes the pixels fit an "LNR" conflict pattern. After finding out the "LNR" conflict pattern along the interpolated scan line L(i), the conflict direction calibration unit 820 has the pixel h6 having a flag of N as a center, draws a symmetric conflict window, and thus confirms the interpolation directions of the pixels (h4~h8) within the conflict window. A pixel g3 having a direction flag of N is found if two pixel searches are conducted from the pixels h4 and h5 along their temporary interpolation directions (L, clockwise). The temporary interpolation directions of the pixels h4 and h5 are wrong and thus should be changed to the 90-degree direction (N). On the other hand, if two pixel searches are conducted from the pixels h7 and h8 along their temporary interpolation directions (R, counterclockwise), two pixels g12 and g13, each having a direction flag of R, will be found. The temporary interpolation directions of the pixels h7 and h8 are obviously correct and thus remain unchanged.

Figure 11A:
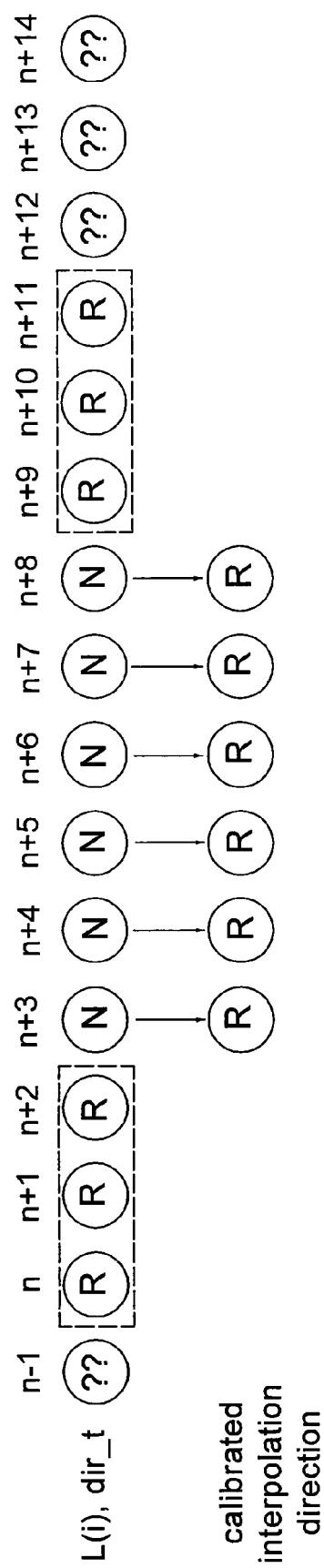
FIG. 11A is an example illustrating that two groups of pixels having the interpolation direction R are isolated by a third group of pixels having the interpolation direction N.

The angle expanding unit 830 compares the temporary interpolation angles angle_t of all the pixels of the interpolated scan line L(i). If two groups of pixels having the same interpolation direction (clockwise or counterclockwise) are isolated by a third group of pixels having the interpolation direction N, the angle expanding unit 830 will set the interpolation direction of the third group of pixels to the same interpolation direction as those of the other two groups of pixels. However, it is required that the interpolation angle differences between the other two groups of pixels having the same interpolation direction (clockwise or counterclockwise) are not big and there is a smooth area located between the third group of pixels without an edge. As shown in FIG. 11A, a first group of three pixels p(i,n)~p(i,n+2) having the interpolation direction R and a second group of three pixels p(i,n+9)~p(i,n+11) having the same interpolation direction R are isolated by a third group of pixels p(i,n+3)~p(i,n+8) having the interpolation direction N. If the interpolation angle differences between the pixels p(i,n)~p(i,n+2) and p(i,n+9)~p(i,n+11) are not big (for example, their angle index values have a difference of 2, 4, or 6) and the area located between the pixels p(i,n+3)~p(i,n+8) is smooth and has no edge, the angle expanding unit 830 will perform calibration on the interpolation directions of the pixels p(i,n+3)~p(i,n+8) and set the interpolation directions of the pixels p(i,n+3)~p(i,n+8) to the counterclockwise direction (R). Moreover, after calibration, the interpolation angles of the pixels p(i,n+3)~p(i,n+8) are set to the average of two interpolation angles of the two pixels p(i,n+2) and p(i,n+9). For example, assuming that angle_t(i,n+2)=a and angle_t(i,n+9)=b, the interpolation angles angle_t(i,n+3)~angle_t(i,n+8) of the pixels p(i,n+3)~p(i,n+8) will be set to (floor((a+b)/4)×2), if they are in the clockwise directions. The interpolation angles angle_t(i,n+3)~angle_t(i,n+8) will be set to (floor((a+b)/4)×2+1), if they are in the clockwise directions, where the function floor(c) returns the largest integer that is not greater than the argument (c).

Figure 11B:
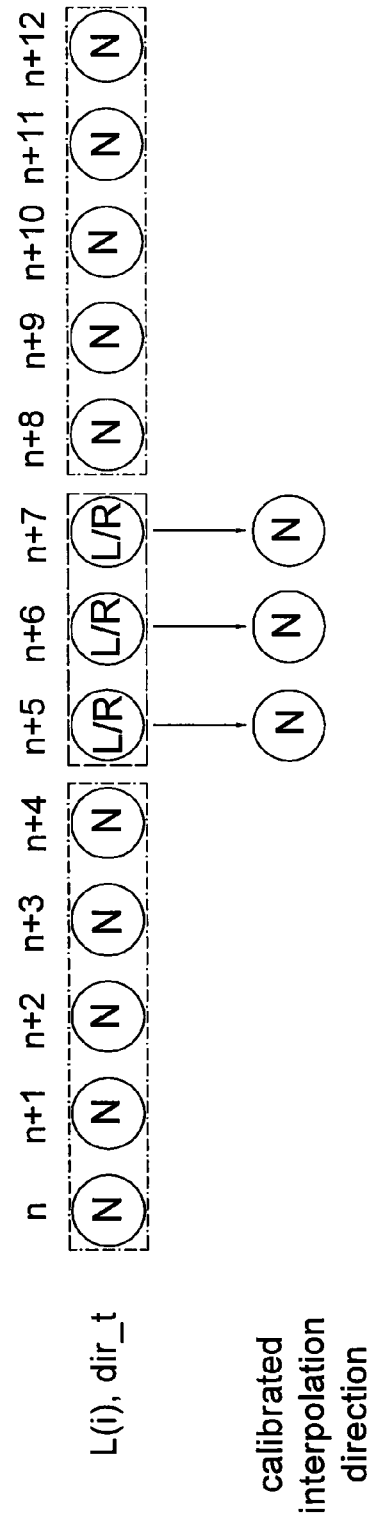
FIG. 11B is an example illustrating that two groups of pixels having the interpolation direction N are isolated by a third group of pixels having low angles.

According to the image characteristic, if the interpolation angle is low enough or highly slanted, the corresponding edge is usually formed by a whole segment of pixels, but not one or two discrete pixels. Thus, the angle excluding circuit 840 is provided to calibrate some discrete pixels having low angles randomly that are distributed among other pixels having an interpolation angle of 90 degrees. As shown in FIG. 11B, a first group of pixels p(i,n)~p(i,n+4) having the interpolation direction N and a second group of the pixels p(i,n+8)~p(i,n+12) having the interpolation direction N are isolated by a third group of the three consecutive pixels p(i,n+5)~p(i,n+7) having the interpolation direction other than N. If the angle index values of the pixels p(i,n+5)~p(i,n+7) are larger than an angle threshold value (that is, the angle is relatively slanted), the angle excluding circuit 840 will perform calibration on the interpolation directions of the pixels p(i,n+5)~p(i,n+7) and set the interpolation directions of the pixels p(i,n+5)~p(i,n+7) to the 90-degree direction (N). Finally, the angle excluding circuit 840 stores the calibrated interpolation direction of each pixel of the interpolated scan line L(i) as the final interpolation direction dir_f in the line buffer 260 and transmits the final interpolation angle angle_f of each pixel of the interpolated scan line L(i) to the interpolator 240.

It should be noted that, according to the post-processing circuit 230 shown in FIG. 8, the complicate scene analyzing unit 810, the conflict direction calibration unit 820, the angle expanding circuit 830 and the angle excluding circuit 840 operate and are arranged in an ascending sequence of their reference numbers. In an alternate embodiment, the complicate scene analyzing unit 810, the conflict direction calibration unit 820, and the angle expanding circuit 830 operate in parallel while the angle excluding circuit 840 is the final stage of the post-processing circuit 230.

The interpolator 240 receives the final interpolation angle angle_f of each pixel of the interpolated scan line L(i), both the luminance values (Y) and chrominance values (U, V) of all the pixels in the scan line L(i−1), and both the luminance values (Y) and chrominance values (U, V) of all the pixels in the scan line L(i+1) (expressed by L(i−1)_YUV and L(i+1)_YUV in FIG. 2). According to the counterclockwise operating matrix in FIG. 3A and the clockwise operating matrix in FIG. 3B, the interpolator 240 calculates the absolute chrominance error chroma_error for each pixel of the interpolated scan line L(i). In this embodiment, the absolute chrominance error chroma_error of a pixel is obtained by calculating the sum of the absolute chrominance differences between the dark point (or the dark points) in the upper matrix and that (or those) in the lower matrix corresponding to its final interpolation angle angle_r Assuming that the upper matrix and the lower matrix shown in FIG. 1 correspond to the final interpolation angle angle_f of the pixel p(i,n) and each of the upper matrix and the lower matrix have two dark points for interpolation and is an even numbered matrix, the absolute chrominance error chroma_error of the pixel p(i,n) is as follows:

$$\text{chroma\_error} = abs(u(i-1,n+1) + u(i-1,n+2) - u(i+1,n-1) - u(i+1,n-2)) + abs(v(i-1,n+1) + v(i-1,n+2) - v(i+1,n-1) - v(i+1,n-2)).$$

If the absolute chrominance error chroma_error is not greater than a predetermined value th4, the YUV interpolation is performed pixel by pixel according to the final interpolation angle angle_f in the interpolator 240. On the contrary, if the absolute chrominance error chroma_error is too large, the interpolator 240 performs the 90-degree interpolation. Accordingly, the luminance, the chrominance, and the final interpolation direction (expressed by L(i)_YUVD in FIG. 2) of each pixel in the interpolated scan line L(i) are obtained.

Figure 12:
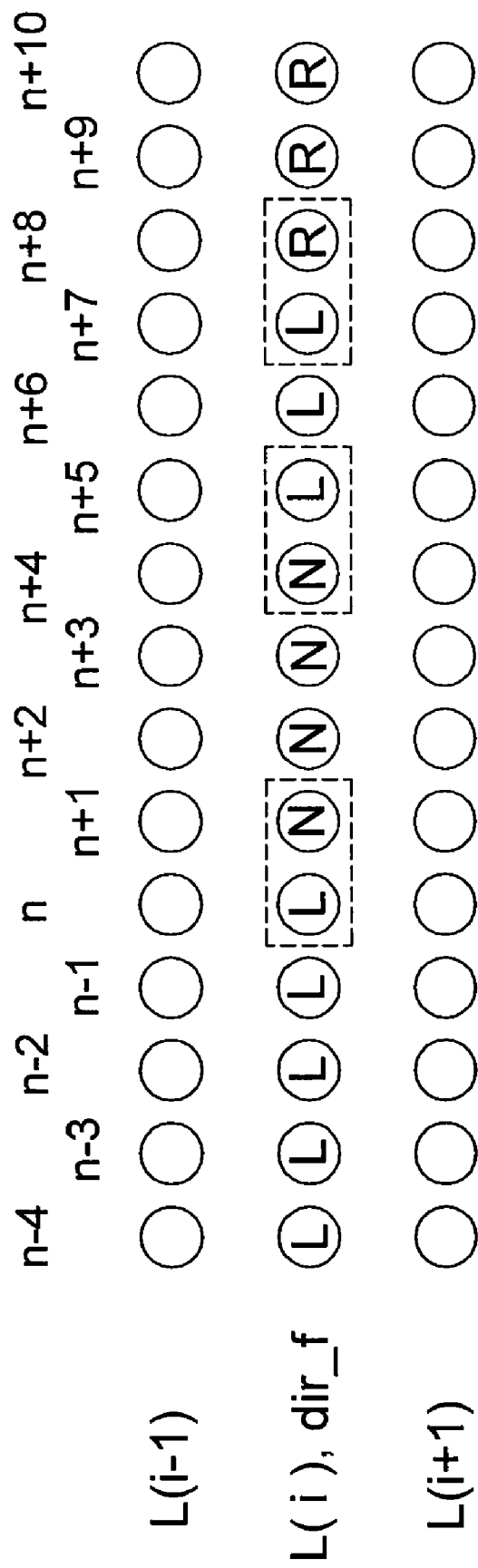
FIG. 12 shows an example of the final interpolations dir_f of a portion of pixels in the interpolated scan line L(i).

Finally, the adaptive 5-point median filter 250 performs a median filtering operation on the pixel having discontinuous interpolation direction dir_f in the interpolated scan line L(i). FIG. 12 shows an example of the final interpolation directions dir_f of a portion of pixels in the interpolated scan line L(i) where three dashed-line rectangles show the final interpolation directions dir_f are discontinuous. For the left dashed-line rectangle in FIG. 12, the adaptive 5-point median filter 250 performs a median filtering operation on the pixels p(i,n−1), p(i,n), and p(i,n+1) of the scan line L(i), the pixel p(i−1,n) of the scan line L(i−1), and the pixel p(i+1,n) of the scan line L(i+1) and selects the Y, U, V values of one pixel having the luminance median as output from the above five pixels. For example, the luminance value (Y) of the pixel p(i,n−1) is the median value of the five pixels and thus the Y, U, V values of the pixel p(i,n−1) is selected as the output of the pixel p(i,n). After that, the adaptive 5-point median filter 250 performs a median filtering operation on the pixels p(i,n), p(i,n+1), and p(i,n+2) of the scan line L(i), the pixel p(i−1,n+1) of the scan line L(i−1), and the pixel p(i+1,n+1) of the scan line L(i+1). Likewise, the Y, U, V values of the pixel having the luminance median is selected as the output of the pixel p(i,n+1) from the above five pixels. Therefore, for each dashed-line rectangle in FIG. 12, the median filtering operation is performed twice to filter out noises so as to increase image quality.

As the adaptive 5-point median filter 250 finishes processing the interpolated scan line L(i), the low angle interpolation apparatus 200 completes all the interpolation operations and filtering operations related to the interpolated scan line L(i). Then, the low angle interpolation apparatus 200 immediately receives next two neighboring scan lines L(i+1) and L(i+3) of the field 280 to generate the next interpolated scan line L(i+2) and repeats the above steps until all the missing scan lines in the field 280 are interpolated.

Figure 13:
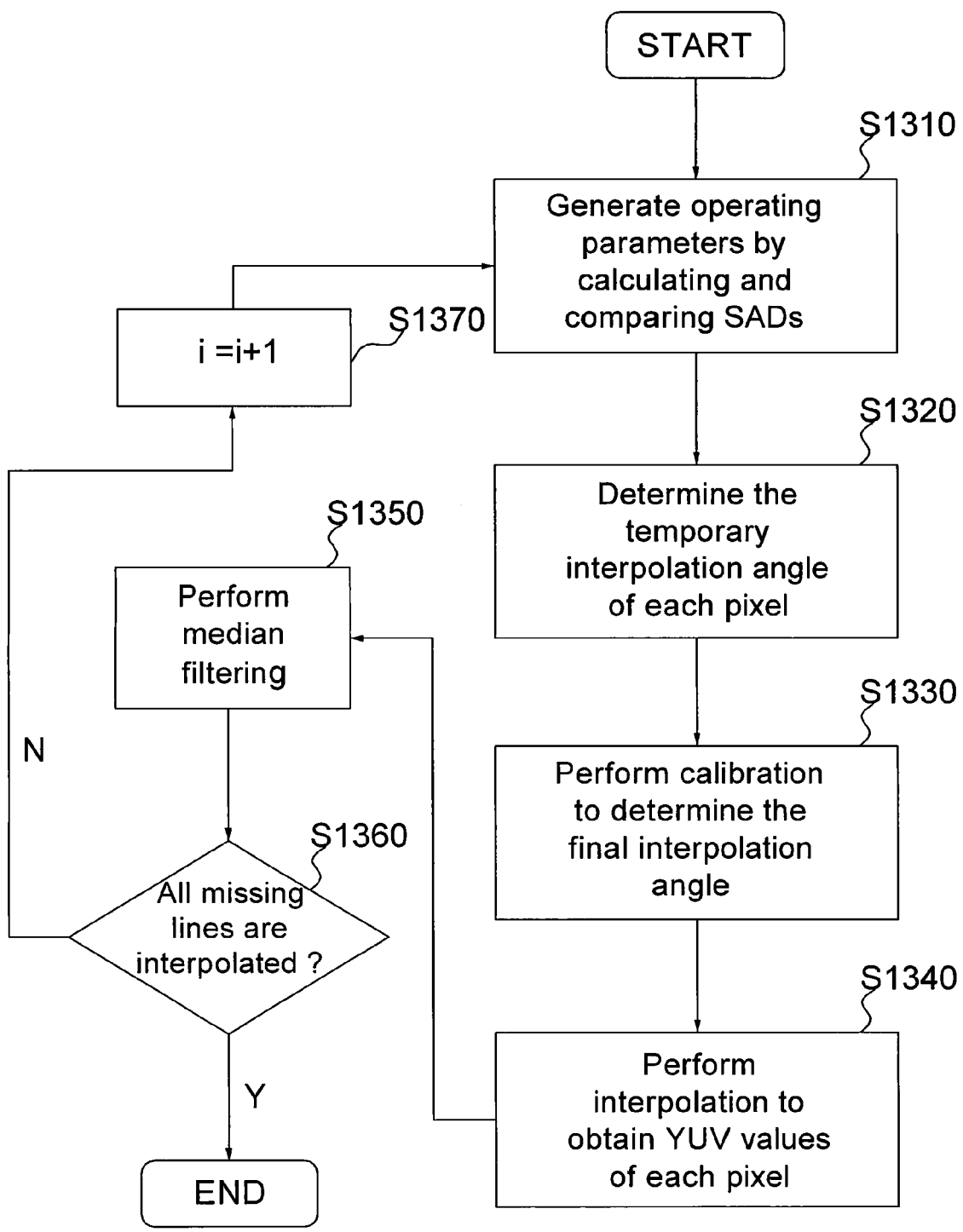
FIG. 13 shows a flow chart of the low angle interpolation method according to the invention.

FIG. 13 shows a flow chart of the low angle interpolation method according to the invention. The low angle interpolation method according to the invention will be described in detail according to FIG. 2, FIG. 3A, FIG. 3B and FIG. 13.

Step S1310: Calculate and compare the SADs of different angles related to each pixel in the interpolated scan line L(i) of the field 280 to generate a plurality of operating parameters for each pixel in the interpolated scan line L(i).

According to the luminance values of all the pixels of the two neighboring scan lines L(i−1) and L(i+1) in the field 280, the counterclockwise operating matrix in FIG. 3A and the clockwise operating matrix in FIG. 3B, the 90-degree SAD sad_n, the ten different counterclockwise SADs and the ten different clockwise SADs of each pixel in the interpolated scan line L(i) are calculated. By comparing the ten different counterclockwise SADs and the ten different clockwise SADs, the following operating parameters are obtained: the minimum counterclockwise SAD min_sad_r and its corresponding angle angle_r, the minimum clockwise SADs min_sad_l and its corresponding angle angle_l, and the 90-degree SAD sad_n.

Step S1320: Determine the temporary interpolation angles angle_t of all the pixels in the interpolated scan line L(i), according to the operating parameters of each pixel in the interpolated scan line L(i) and the final interpolation directions dir_f of all the pixels of the preceding interpolated scan line L(i−2).

According to the operating parameters min_sad_r, min_sad_l, angle_r, angle_l and sad_n of each pixel in the interpolated scan line L(i) and the final interpolation directions dir_f of all the pixels in the preceding interpolated scan line L(i−2) stored in the line buffer 260, the temporary interpolation angle angle_t of each pixel in the interpolated scan line L(i) are determined pixel by pixel.

Step S1330: Perform calibration on the interpolation directions to determine the final interpolation angle angle_f and the final interpolation direction dir_f of each pixel in the interpolated scan line L(i) based on the temporary interpolation angles angle_t of all the pixels in the interpolated scan line L(i) and the final interpolation directions dir_f of all the pixels in the preceding interpolated scan line L(i−2).

Step S1340: Perform interpolation to obtain the luminance value (Y) and the chrominance value (U,V) of each pixel in the interpolated scan line L(i).

The final interpolation angle angle_f of each pixel in the interpolated scan line L(i), the luminance values (Y) and the chrominance values (U,V) of all the pixels in the scan line L(i−1), and the luminance values (Y) and the chrominance values (U,V) of all the pixels in the scan line L(i+1) are provided. According to the counterclockwise operating matrix in FIG. 3A and the clockwise operating matrix in FIG. 3B, the absolute chrominance error chroma_error is calculated. If the absolute chrominance error chroma_error of one pixel is not greater than a predetermined value th4, the interpolation corresponding to its final interpolation angle angle_f is performed. On the contrary, if the absolute chrominance error chroma_error of the pixel is too large, the 90-degree interpolation is performed. Thus, the luminance value (Y), the chrominance value (U,V), and the final interpolation direction dir_f are obtained pixel by pixel with respect to the interpolated scan line L(i).

Step S1350: Perform median filtering operations on the pixels having discontinuous final interpolation directions along the interpolated scan line L(i). It should be noted that this step is optional according to the invention; however, this step achieves a positive effect of filtering out noises and enhancing the image quality.

Step S1360: Determine whether all the missing scan lines are interpolated in this field 280 or not. If YES, the flow goes to the step S1370; otherwise, the flow is completed.

Step S1370: i=i+1. After i is incremented by one, the flow returns to the step S1310 for generating the next interpolated scan line L(i+2) according to the two neighboring original scan lines L(i+1) and L(i+3) in the field 280.

FIG. 13 disclosed above are illustrative only, as each step can be modified or combined with other steps without departing from the spirit of the invention.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. An apparatus of low angle interpolation for generating an interpolated scan line between a first scan line and a second line of a field, the apparatus comprising:
    a low angle calculation circuit for receiving all luminance values of the first scan line and of the second scan line, calculating and comparing sums of absolute differences (SADs) of all angles of each pixel in the interpolated scan line and generating a plurality of operating parameters of each pixel in the interpolated scan line based on a counterclockwise operating matrix and a clockwise operating matrix;
    a line buffer for storing final interpolation directions of all pixels of the preceding interpolated scan line;
    a direction decision circuit coupled to the line buffer and the low angle calculation circuit for determining a temporary interpolation angle of each pixel in the interpolated scan line based on the operating parameters of each pixel in the interpolated scan line and the final interpolation directions of all the pixels of the preceding interpolated scan line;
    a post-processing circuit coupled to the line buffer and the direction decision circuit for performing calibration on the interpolation direction and determining a final interpolation angle and the final interpolation direction of each pixel in the interpolated scan line based on the temporary interpolation angles of all the pixels in the interpolated scan line and the final interpolation directions of all the pixels of the preceding interpolated scan line; and
    an interpolator coupled to the post-processing circuit for receiving the final interpolation angle of each pixel of the interpolated scan line, both the luminance values and chrominance values of all pixels in the first scan line, and both the luminance values and the chrominance values of all pixels in the second scan line, and performing interpolation corresponding to either the final interpolation angle or 90 degrees depending on an absolute chrominance error of each pixel in the interpolated scan line so as to obtain the luminance value and the chrominance value of each pixel in the interpolated scan line;
    wherein each of the final interpolation angle and the temporary final interpolation angle comprises the interpolation direction information.

2. The apparatus according to claim 1, further comprising:
    a median filter for performing a median filtering operation on the luminance values and the chrominance values of the pixels having discontinuous final interpolation directions in the interpolated scan line.

3. The apparatus according to claim 1, wherein the operating parameters comprise the minimum sum of counterclockwise absolute differences, a first angle in a counterclockwise direction, the minimum sum of clockwise absolute differences, a second angle in a clockwise direction, and a sum of 90-degree absolute differences.

4. The apparatus according to claim 3, wherein the direction decision circuit comprises:
    a left-right decision circuit for assigning a direction flag and determining the initial interpolation angle and the corresponding minimum sum of the absolute differences of each pixel in the interpolated scan line according to the minimum sum of counterclockwise absolute differences, the first angle in the counterclockwise direction, the minimum sum of clockwise absolute differences, and the second angle in the clockwise direction of each pixel in the interpolated scan line, and the final interpolation directions of all the pixels in the preceding interpolated scan line; and
    a direction selecting circuit for determining the temporary interpolation angle according to the initial interpolation angle, the minimum sum of absolute differences related to the initial interpolation angle and the sum of 90 degree absolute differences of each pixel in the interpolated scan line;
    wherein the direction flag is selected from the group comprising a clockwise strong flag, a clockwise weak flag, a counterclockwise strong flag, and a counterclockwise weak flag.

5. The apparatus according to claim 4, wherein the left-right decision circuit sets the initial interpolation angle of the pixel having the counterclockwise strong flag in the interpolated scan line to the first angle in the counterclockwise direction and sets the initial interpolation angle of the pixel having the clockwise strong flag in the interpolated scan line to the second angle in the clockwise direction.

6. The apparatus according to claim 5, wherein the left-right decision circuit comprises:
    a first auxiliary deciding unit coupled to the low angle calculation circuit for setting the initial interpolation angles of y consecutive pixels having either the clockwise weak flag or the counterclockwise weak flag to the second angle in the clockwise direction if x consecutive pixels having the clockwise strong flag followed by the y consecutive pixels are found along a specified direction of the interpolated scan line, and for setting the initial interpolation angle of the y pixels to the first angle in the counterclockwise direction if x consecutive pixels having the counterclockwise strong flag followed by the y consecutive pixels are found along the specified direction of the interpolated scan line where x and y are positive integers and adjustable; and a second auxiliary deciding unit coupled to the first auxiliary deciding unit and the line buffer for setting the initial interpolation angle of the pixel having the counterclockwise weak flag or having the clockwise weak flag according to the final interpolation directions of two pixels in the preceding interpolated scan line corresponding to the first angle in the counterclockwise direction and the second angle in the clockwise direction of the pixel having the counterclockwise weak flag or having the clockwise weak flag.

7. The apparatus according to claim 1, wherein the width of the counterclockwise operating matrix and the width of the clockwise operating matrix both increase as the angle decreases.

8. The apparatus according to claim 1, wherein the counterclockwise operating matrix and the clockwise operating matrix are divided into r angle matrixes where r is a positive integer and each angle matrix comprises a pair of upper and lower matrixes.

9. The apparatus according to claim 8, wherein the low angle calculation circuit comprises:
a gradient compensation unit for compensating for the sum of 90-degree absolute differences of each pixel of the interpolated scan line according to the sum of absolute luminance differences between pixel pairs in the first scan line and those in the second scan line in the horizontal and vertical directions within a gradient window having the pixel as the center; and
a broken-angle compensation unit for compensating for r sums of clockwise absolute differences and r sums of counterclockwise absolute differences of each pixel of the interpolated scan line by evaluating the degree that the windows of the upper and lower matrixes corresponding to each angle overlap with either one end of an edge.

10. The apparatus according to claim 9, wherein the low angle calculation circuit further comprises a slope compensation unit for compensating for the sum of absolute differences of each angle of each pixel of the interpolated scan line with a corresponding predetermined compensation value and the corresponding predetermined compensation value is either proportional to or inversely proportional to the corresponding angle.

11. The apparatus according to claim 1, wherein the post-processing circuit comprises:
a complicate scene analyzing unit for calculating the sum of the absolute luminance differences between pixel pairs in the first scan line and those in the second scan line in the horizontal direction within a scene window and for setting the final interpolation angle to the 90-degree angle if the sum of the absolute luminance differences is larger than a scene threshold value;
a conflict direction calibration unit for determining the final interpolation angles of at least two pixels fitting a specific conflict pattern within a conflict window in the interpolated scan line according to the temporary interpolation angles of the at least two pixels and the final interpolation directions of all the pixels of the preceding interpolated scan line;
an angle expanding circuit for setting the final interpolation direction of a third group of pixels having a 90-degree interpolation direction to a first interpolation direction if a first group of pixels and a second group of pixels having a first interpolation direction is isolated by the third group of pixels in the interpolated scan line, wherein the first interpolation direction is either counterclockwise or clockwise and differences between the final interpolation angles of the first group of pixels and the final interpolation angles of the second group of pixels are smaller than a first predetermined angle and no edge is located between the third group of pixels; and
an angle excluding circuit for setting the final interpolation angle of a sixth group of pixels having a first interpolation angle to 90 degrees if a fourth group of pixels and a fifth group of pixels having a 90-degree interpolation angle are isolated by the sixth group of pixels in the interpolated scan line, wherein the first interpolation angle is smaller than a second predetermined angle;
wherein the specific conflict pattern is selected from the group comprising LR, RL, LNR, RNL, LNNR, and RNNL.

12. A method of low angle interpolation for generating an interpolated scan line between a first scan line and a second line of a field, the method comprising the following steps:
calculating and comparing the sum of the absolute differences of all angles of each pixel in the interpolated scan line to generate a plurality of operating parameters for each pixel in the interpolated scan line based on all luminance values of the first scan line, all luminance values of the second scan line, a counterclockwise operating matrix, and a clockwise operating matrix;
determining temporary interpolation angles of all the pixels in the interpolated scan line, based on the operating parameters of each pixel in the interpolated scan line and the final interpolation directions of all the pixels of the preceding interpolated scan line;
performing calibration on interpolation directions based on the temporary interpolation angles of all the pixels in the interpolated scan line and the final interpolation direction of each pixel of the preceding interpolated scan line to determine the final interpolation angles and the final interpolation directions of all the pixels in the interpolated scan line; and
performing interpolation corresponding to either the final interpolation angle or 90 degrees depending on an absolute chrominance error of each pixel in the interpolated scan line so as to obtain the luminance value and the chrominance value of each pixel in the interpolated scan line based on the final interpolation angle of each pixel in the interpolated scan line, both the luminance values and the chrominance values of all the pixels in the first scan line, and both the luminance values and the chrominance values of all the pixels in the second scan line;
wherein each of the final interpolation angle and the temporary final interpolation angle comprises the interpolation direction information.

13. The method according to claim 12, further comprising:
performing a median filtering operation on the luminance values and the chrominance values of the pixels having discontinuous final interpolation directions in the interpolated scan line.

14. The method according to claim 12, wherein the operating parameters comprise the minimum sum of counterclockwise absolute differences, a first angle in a counterclockwise direction, the minimum sum of clockwise absolute differences, a second angle in a clockwise direction left angle, and the sum of 90-degree absolute differences.

15. The method according to claim 14, wherein the step of determining the temporary interpolation angles of all the pixels in the interpolated scan line comprises:
assigning a direction flag to determine the initial interpolation angle and the corresponding minimum sum of the absolute differences of each pixel in the interpolated scan line according to the minimum sum of counterclockwise absolute differences, the first angle in the counterclockwise direction, the minimum sum of clockwise absolute differences, and the second angle in the clockwise direction of each pixel in the interpolated scan line, and the final interpolation directions of all the pixels in the preceding interpolated scan line; and determining the temporary interpolation angle according to the initial interpolation angle, the minimum sum of absolute differences related to the initial interpolation angle and the sum of 90 degree absolute differences of each pixel in the interpolated scan line;

wherein the direction flag is selected from the group comprising a clockwise strong flag, a clockwise weak flag, a counterclockwise strong flag, and a counterclockwise weak flag.

16. The method according to claim 15, wherein the step of assigning the direction flag comprises:

setting the initial interpolation angle of the pixel having the counterclockwise strong flag in the interpolated scan line to the first angle in the counterclockwise direction;

setting the initial interpolation angle of the pixel having the clockwise strong flag in the interpolated scan line to the second angle in the clockwise direction;

setting the initial interpolation angles of y consecutive pixels having either the clockwise weak flag or counterclockwise weak flag to the second angle in the clockwise direction if x consecutive pixels having the clockwise strong flag followed by the y consecutive pixels are found along a specified direction of the interpolated scan line;

setting the initial interpolation angle of y consecutive pixels having either the clockwise weak flag or counterclockwise weak flag to the first angle in the counterclockwise direction if x consecutive pixels having the counterclockwise strong flag followed by the y consecutive pixels are found along the specified direction of the interpolated scan line where x and y are positive integers and adjustable; and setting the initial interpolation angle of the pixel having the counterclockwise weak flag or having the clockwise weak flag according to the final interpolation directions of two pixels in the preceding interpolated scan line corresponding to the first angle in the counterclockwise direction and the second angle in the clockwise direction of the pixel having the counterclockwise weak flag or having the clockwise weak flag.

17. The method according to claim 12, wherein the width of the counterclockwise operating matrix and the width of the clockwise operating matrix both increase as the angle decreases.

18. The method according to claim 12, wherein the counterclockwise operating matrix and the clockwise operating matrix are divided into r angle matrixes where r is a positive integer and each angle matrix comprises a pair of upper and lower matrixes.

19. The method according to claim 18, wherein the step of calculating and comparing comprises:

compensating for the sum of 90-degree absolute differences of each pixel of the interpolated scan line according to the sum of absolute luminance differences between pixel pairs in the first scan line and those in the second scan line in the horizontal and vertical directions within the gradient window having the pixel as the center; and compensating for r sums of clockwise absolute differences and r sums of counterclockwise absolute differences of each pixel of the interpolated scan line by evaluating the degree that the windows of the upper and lower matrixes corresponding to each angle overlap with either one end of an edge.

20. The method according to claim 12, wherein the step of performing calibration comprises:

setting the final interpolation angle to the 90-degree angle if the sum of the absolute luminance differences between pixel pairs in the first scan line and those in the second scan line in the horizontal direction within a scene window is larger than a scene threshold value;

determining the final interpolation angles of at least two pixels fitting a specific conflict pattern within a conflict window in the interpolated scan line according to the temporary interpolation angles of the at least two pixels and the final interpolation directions of all the pixels of the preceding interpolated scan line;

setting the final interpolation direction of a third group of pixels having a 90-degree interpolation direction to a first interpolation direction if a first group of pixels and a second group of pixels having a first interpolation direction is isolated by the third group of pixels in the interpolated scan line, wherein the first interpolation direction is either counterclockwise or clockwise and differences between the final interpolation angles of the first group of pixels and the final interpolation angles of the second group of pixels are smaller than a first predetermined angle and no edge is located between the third group of pixels; and setting the final interpolation angle of a sixth group of pixels having a first interpolation angle to 90 degrees if a fourth group of pixels and a fifth group of pixels having a 90-degree interpolation angle are isolated by the sixth group of pixels in the interpolated scan line, wherein the first interpolation angle is smaller than a second predetermined angle;

wherein the specific conflict pattern is selected from the group comprising LR, RL, LNR, RNL, LNNR, and RNNL.

* * * * *